United States Patent
Zhang et al.

(10) Patent No.: US 9,999,029 B2
(45) Date of Patent: Jun. 12, 2018

(54) INTER-BASE STATION DATA TRANSMISSION METHOD USING CARRIER AGGREGATION

(71) Applicant: Huawei Technologies Co., Ltd., Shenzhen (CN)

(72) Inventors: Jian Zhang, Shenzhen (CN); Wei Quan, Shenzhen (CN); Yu Wang, Shenzhen (CN); Zhenxing Hu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 166 days.

(21) Appl. No.: 14/804,045

(22) Filed: Jul. 20, 2015

(65) Prior Publication Data
US 2015/0382336 A1    Dec. 31, 2015

Related U.S. Application Data

(63) Continuation of application No. PCT/CN2013/074883, filed on Apr. 27, 2013.

(30) Foreign Application Priority Data

Jan. 18, 2013   (WO) ............... PCT/CN2013/070703

(51) Int. Cl.
H04W 4/00        (2018.01)
H04W 72/04       (2009.01)
(Continued)

(52) U.S. Cl.
CPC ....... *H04W 72/0406* (2013.01); *H04L 1/0003* (2013.01); *H04L 1/1812* (2013.01);
(Continued)

(58) Field of Classification Search
CPC ............... H04W 72/0406; H04W 72/085
(Continued)

(56) References Cited

U.S. PATENT DOCUMENTS

2007/0298825 A1* 12/2007 Kayama ............ H04W 52/267
                                                       455/522
2009/0245204 A1   10/2009 Voyer et al.
(Continued)

FOREIGN PATENT DOCUMENTS

CN    101557623 A    10/2009
CN    101621318 A    1/2010
(Continued)

OTHER PUBLICATIONS

"3$^{rd}$ Generation Partnership Project; Technical Specification Group Radio Access Network; Evolved Universal Terrestrial Radio Access (E-UTRA); Radio Resource Control (RRC); Protocol specification (Release 11)," 3GPP TS 36.331, V11.2.0, 3$^{rd}$ Generation Partnership Project, Valbonne, France (Dec. 2012).
(Continued)

*Primary Examiner* — Farah Faroul
(74) *Attorney, Agent, or Firm* — Leydig, Voit & Mayer, Ltd.

(57) ABSTRACT

Embodiments of the present invention provide a data transmission method, a base station, and a user equipment (UE), wherein a primary base station configures a data transmission parameter for a secondary base station, to assist the secondary base station to perform uplink and downlink data transmission for the UE. Therefore, the primary base station and the secondary base station transmit and receive data according to the same data transmission parameter, and there is no need to perform extra processing on the data transmitted and received by the secondary base station, that is, the secondary base station can only reserve simple buffering, (Continued)

encapsulating, and transceiving functions, or even only reserve buffering and transceiving functions, so that a protocol design of the secondary base station is simplified, and cost of the secondary base station, especially cost of a micro base station serving as the secondary base station is reduced.

17 Claims, 11 Drawing Sheets

(51) Int. Cl.
| | | |
|---|---|---|
| H04W 16/32 | (2009.01) | |
| H04L 1/00 | (2006.01) | |
| H04L 1/18 | (2006.01) | |
| H04W 72/08 | (2009.01) | |
| H04B 7/155 | (2006.01) | |
| H04W 88/02 | (2009.01) | |
| H04W 88/08 | (2009.01) | |
| H04W 84/04 | (2009.01) | |
| H04L 12/835 | (2013.01) | |

(52) U.S. Cl.
CPC ......... *H04W 16/32* (2013.01); *H04W 72/085* (2013.01); *H04B 7/155* (2013.01); *H04L 47/30* (2013.01); *H04W 84/045* (2013.01); *H04W 88/02* (2013.01); *H04W 88/08* (2013.01)

(58) Field of Classification Search
USPC .................................................. 370/252, 329
See application file for complete search history.

(56) References Cited

U.S. PATENT DOCUMENTS

| | | | |
|---|---|---|---|
| 2010/0302946 A1 | 12/2010 | Yang et al. | |
| 2010/0322146 A1* | 12/2010 | Liu | H04B 7/155 370/315 |
| 2012/0028676 A1* | 2/2012 | He | H04W 36/0094 455/525 |
| 2012/0322486 A1 | 12/2012 | Kameno et al. | |
| 2013/0012249 A1 | 1/2013 | Centonza et al. | |
| 2013/0021929 A1* | 1/2013 | Kim | H04B 7/024 370/252 |
| 2013/0021996 A1* | 1/2013 | Wang | H04W 72/082 370/329 |
| 2013/0070682 A1 | 3/2013 | Kim et al. | |
| 2013/0170362 A1 | 7/2013 | Futaki et al. | |
| 2014/0153504 A1* | 6/2014 | Wang | H04W 28/14 370/329 |
| 2014/0233384 A1* | 8/2014 | Howard | H04W 28/0289 370/235 |
| 2014/0329554 A1* | 11/2014 | Froberg Olsson | H04W 52/244 455/522 |
| 2015/0003329 A1* | 1/2015 | Morita | H04B 7/024 370/328 |
| 2016/0007361 A1* | 1/2016 | Andersson | H04L 5/0053 370/329 |

FOREIGN PATENT DOCUMENTS

| | | |
|---|---|---|
| CN | 101741449 A | 6/2010 |
| CN | 101998492 A | 3/2011 |
| CN | 102783231 A | 11/2012 |
| EP | 2530863 A2 | 12/2012 |
| WO | WO 2008009781 A1 | 1/2008 |
| WO | WO 2011108637 A1 | 9/2011 |
| WO | WO 2011155784 A2 | 12/2011 |
| WO | WO 2012043307 A1 | 4/2012 |

OTHER PUBLICATIONS

"3$^{rd}$ Generation Partnership Project; Technical Specification Group Radio Access Network; Evolved Universal Terrestrial Radio Access (E-UTRA); Medium Access Control (MAC) protocol specification (Release 11)," 3GPP TS 36.321, V11.1.0, 3$^{rd}$ Generation Partnership Project, Valbonne, France (Dec. 2012).

"3$^{rd}$ Generation Partnership Project; Technical Specification Group Radio Access Network; Evolved Universal Terrestrial Radio Access Network (E-UTRAN); X2 application protocol (X2AP) (Release 11)," 3GPP TS 36.423, V11.3.0, 3$^{rd}$ Generation Partnership Project, Valbonne, France (Dec. 2012).

"3$^{rd}$ Generation Partnership Project; Technical Specification Group Radio Access Network; Evolved Universal Terrestrial Radio Access (E-UTRA); Physical layer procedures (Release 11)," 3GPP TS 36.213, V11.1.0, 3$^{rd}$ Generation Partnership Project, Valbonne, France (Dec. 2012).

* cited by examiner

INTER-BASE STATION DATA TRANSMISSION METHOD USING CARRIER AGGREGATION

CROSS-REFERENCE TO RELATED APPLICATIONS

The application is a continuation of International Patent Application No. PCT/CN2013/074883, filed on Apr. 27, 2013, which claims priority to International Patent Application No. PCT/CN2013/070703, filed on Jan. 18, 2013, which is incorporated herein by reference in its entirety.

TECHNICAL FIELD

The present invention relates to the field of mobile communications technologies, and in particular, to a data transmission method, a base station and user equipment.

BACKGROUND

With respective developments of mobile communications technologies and broadband wireless access technologies, services of the mobile communications technologies and services of the broadband wireless access technologies permeate each other. In order to meet a broadband requirement of mobile communications and to response to a challenge of mobile broadband communications, technologies such as carrier aggregation (carrier aggregation, CA) are introduced into a mobile communications system.

With the CA technology, a wider bandwidth is obtained by aggregating multiple continuous or discontinuous component carriers, thereby improving a peak data rate and a system throughput and meanwhile solving a problem of a discontinuous operator spectrum. A user equipment (user equipment, UE) may support aggregation of multiple component carriers (component carrier, CC) in downlink and uplink. The aggregated multiple component carriers include a primary component carrier and at least one secondary component carrier. When the aggregated component carriers belong to different base stations, a technology of inter-base station CA (or referred as cross-base station CA) is involved. In the technology of inter-base station CA, a base station to which the primary component carrier belongs is a primary base station, and a base station to which a secondary component carrier belongs is a secondary base station. Specifically, both the primary base station and the secondary base station may be macro base stations or micro base stations (or referred as small base station). Certainly, the primary base station may be a macro base station, and the secondary base station may be a micro base station. In a scene where the macro base station is the primary base station and the micro base station is the secondary base station, the macro base station and the micro base station simultaneously serve the UE to improve throughput of the UE. Specifically, the macro base station may provide coverage and mobility management, and the micro base station may provide data transmission.

Presently, it is complicated to implement a protocol of the secondary base station. Even the secondary base station is a micro base station, it needs to implement a basic protocol stack and functions of a common base station, for example, all functions of radio link control (radio link control, RLC) and media access control (media access control, MAC); hence, cost of the micro base station is difficult to be reduced.

SUMMARY

In view of the above, embodiments of the present invention provide a data transmission method, a base station and a user equipment to simplify a protocol design of a secondary base station and reduce cost of the secondary base station.

In a first aspect, a data transmission method is provided, the method includes: sending, by a primary base station, a data transmission parameter to a secondary base station; sending, by the primary base station in a downlink data transmission process, downlink data to the secondary base station according to the data transmission parameter, so as to send the downlink data to a user equipment through the secondary base station; or receiving, by the primary base station in an uplink data transmission process, uplink data that is received by the secondary base station according to the data transmission parameter.

In a first possible implementation of the first aspect, the data transmission parameter includes a data packet size.

With reference to the first possible implementation of the first aspect, in a second possible implementation of the first aspect, the sending, by the primary base station in a downlink data transmission process, downlink data to the secondary base station according to the data transmission parameter, so as to send the downlink data to a user equipment through the secondary base station includes: generating, by the primary base station, a downlink data packet according to the data packet size, and sending the downlink data packet to the secondary base station, so as to send the downlink data packet to the user equipment through the secondary base station.

With reference to the first aspect or the first or the second possible implementation of the first aspect, in a third possible implementation of the first aspect, the data transmission parameter includes a modulation and coding scheme.

With reference to the first aspect or one of the first to the third possible implementations of the first aspect, in a fourth possible implementation of the first aspect, the data transmission parameter includes resource information.

With reference to the first aspect or one of the first to the fourth possible implementations of the first aspect, in a fifth possible implementation of the first aspect, the data transmission parameter includes a maximum quantity of transmission times or a maximum quantity of retransmission times.

With reference to the fifth possible implementation of the first aspect, in a sixth possible implementation of the first aspect, the maximum quantity of transmission times is one.

With reference to the fifth possible implementation of the first aspect, in a seventh possible implementation of the first aspect, the maximum quantity of transmission times is two, or the maximum quantity of retransmission times is one.

With reference to the first aspect or one of the first to the seventh possible implementations of the first aspect, in an eighth possible implementation of the first aspect, the method further includes: sending, by the primary base station, a configuration parameter to the user equipment, so that the user equipment feeds back a reception condition of the downlink data or retransmits the uplink data according to the configuration parameter.

With reference to the eighth possible implementation of the first aspect, in a ninth possible implementation of the first aspect, the configuration parameter includes a resource parameter.

With reference to the eighth possible implementation of the first aspect, in a tenth possible implementation of the first aspect, the configuration parameter is the same as the data transmission parameter sent to the secondary base station.

With reference to the first aspect or one of the first to the tenth possible implementations of the first aspect, in an eleventh possible implementation of the first aspect, in the downlink data transmission process, the primary base station sends the downlink data to the secondary base station based on maximum transmission time intervals (TTIs), and where the maximum TTIs refer to TTIs that are required when the primary base station assumes that the secondary base station sends each data packet at a maximum quantity of retransmission times or a maximum quantity of transmission times to complete the sending of the data packet.

With reference to the first aspect or one of the first to the eleventh possible implementations of the first aspect, in a twelfth possible implementation of the first aspect, the method further includes: receiving, by the primary base station when an amount of data buffered in the secondary base station exceeds a threshold and maintains exceeding the threshold for a period of time, status information that is of data transmission and sent by the secondary base station; and adjusting, by the primary base station, downlink data transmission according to the status information.

With reference to the first aspect or one of the first to the twelfth possible implementations of the first aspect, in a thirteenth possible implementation of the first aspect, in the downlink data transmission process, the method further includes: receiving, by the primary base station, acknowledgement information fed back by the user equipment, where the acknowledgement information is also fed back to the secondary base station, and an HARQ retransmission is performed by the secondary base station; and reducing, by the primary base station when the acknowledgement information is NACK, a speed of sending the downlink data to the secondary base station.

With reference to the first aspect or one of the first to the twelfth possible implementations of the first aspect, in a fourteenth possible implementation of the first aspect, in the downlink data transmission process, the method further includes: receiving, by the primary base station, acknowledgement information fed back by the user equipment; and performing, by the primary base station when the acknowledgement information is NACK, an HARQ retransmission.

With reference to the first aspect or one of the first to the fourteenth possible implementations of the first aspect, in a fifteenth possible implementation of the first aspect, the method further includes: sending, by the primary base station, a measurement parameter of the secondary base station to the user equipment; receiving, by the primary base station, a measurement result reported by the user equipment directly or through the secondary base station, where the measurement result is obtained after the user equipment performs measurement according to the measurement parameter; and configuring or adjusting, by the primary base station, the data transmission parameter according to the measurement result.

In a second aspect, a data transmission method is provided, the method includes: receiving, by a secondary base station, a data transmission parameter sent by a primary base station; receiving, by the secondary base station in a downlink data transmission process, downlink data that is sent by the primary base station according to the data transmission parameter, and sending, by the secondary base station in the downlink data transmission process, the downlink data to a user equipment; or receiving, by the secondary base station in an uplink data transmission process, uplink data according to the data transmission parameter, and sending, by the secondary base station in the uplink data transmission process, the uplink data to the primary base station.

In a first possible implementation of the second aspect, the data transmission parameter includes a data packet size.

With reference to the first possible implementation of the second aspect, in a second possible implementation of the second aspect, the downlink data that is sent by the primary base station according to the data transmission parameter and is received by the secondary base station is a downlink data packet generated by the primary base station according to the data packet size.

With reference to the second aspect or the first or the second possible implementation of the second aspect, in a third possible implementation of the second aspect, the data transmission parameter includes a modulation and coding scheme. The sending, by the secondary base station, the downlink data to the user equipment comprises: sending, by the secondary base station, the downlink data to the user equipment according to the modulation and coding scheme; or the sending, by the secondary base station, the uplink data to the primary base station comprises: sending, by the secondary base station, the uplink data to the primary base station according to the modulation and coding scheme.

With reference to the second aspect or one of the first to the third possible implementations of the second aspect, in a fourth possible implementation of the second aspect, the data transmission parameter includes resource information. The sending, by the secondary base station, the downlink data to the user equipment comprises: sending, by the secondary base station to the user equipment, the downlink data on a downlink resource determined by the resource information; or the receiving, by the secondary base station, the uplink data according to the data transmission parameter comprises: scheduling, by the secondary base station, an uplink resource determined by the resource information, and receiving the uplink data on the determined uplink resource.

With reference to the second aspect or one of the first to the fourth possible implementations of the second aspect, in a fifth possible implementation of the second aspect, the data transmission parameter includes a maximum quantity of transmission times or a maximum quantity of retransmission times. The secondary base station discards, in the downlink data transmission process, a data packet of which a quantity of transmission times reaches the maximum quantity of transmission times or a data packet of which a quantity of retransmission times reaches the maximum quantity of retransmission times.

With reference to the fifth possible implementation of the second aspect, in a sixth possible implementation of the second aspect, the maximum quantity of transmission times is one.

With reference to the fifth possible implementation of the second aspect, in a seventh possible implementation of the second aspect, the maximum quantity of transmission times is two, or the maximum quantity of retransmission times is one.

With reference to the second aspect or one of the first to the seventh possible implementations of the second aspect, in an eighth possible implementation of the second aspect, in the downlink data transmission process, the secondary base station receives, based on maximum transmission time intervals (TTIs), data sent by the primary base station, and the maximum TTIs refer to TTIs that are required when the primary base station assumes that the secondary base station sends each data packet at a maximum quantity of retransmission times or a maximum quantity of transmission times to complete the sending of the data packet.

With reference to the second aspect or one of the first to the eighth possible implementations of the second aspect, in a ninth possible implementation of the second aspect, the method further includes: sending, by the secondary base station when an amount of data buffered in the secondary base station exceeds a threshold and maintains exceeding the threshold for a period of time, status information of data transmission to the primary base station, so that the primary base station adjusts downlink data transmission according to the status information.

In a third aspect, a data transmission method is provided, the method includes: receiving, by a user equipment, a configuration parameter sent by a primary base station; feeding back, by the user equipment when the user equipment receives downlink data sent by a secondary base station in a downlink data transmission process, a reception condition of the downlink data according to the configuration parameter; or sending, by the user equipment in an uplink data transmission process, uplink data to a secondary base station according to the configuration parameter.

In a first possible implementation of the third aspect, the configuration parameter includes a resource parameter. The feeding back, by the user equipment, the reception condition of the downlink data according to the configuration parameter comprises: feeding back, by the user equipment, the reception condition of the downlink data on a resource determined by the resource parameter; or the sending, by the user equipment, the uplink data to the secondary base station according to the configuration parameter comprises: sending, by the user equipment, the uplink data on a resource determined by the resource parameter to the secondary base station.

With reference to the third aspect or the first possible implementation of the third aspect, in a second possible implementation of the third aspect, in the downlink data transmission process, the method further includes: feeding back, by the user equipment, acknowledgement information to both the primary base station and the secondary base station, so that when the acknowledgement information is NACK, the secondary base station performs an HARQ retransmission and the primary base station reduces a speed of sending downlink data to the secondary base station.

With reference to the third aspect or the first possible implementation of the third aspect, in a third possible implementation of the third aspect, in the downlink data transmission process, the method may further include: feeding back, by the user equipment, acknowledgement information to the primary base station, so that when the acknowledgement information is NACK, the primary base station performs an HARQ retransmission.

With reference to the third aspect or one of the first to the third possible implementations of the third aspect, in a fourth possible implementation of the third aspect, the method further includes: receiving, by the user equipment, a measurement parameter that is of the secondary base station and sent by the primary base station; performing, by the user equipment, a measurement on a downlink channel of the secondary base station according to the measurement parameter; and reporting a measurement result to the primary base station directly or through the secondary base station.

In a fourth aspect, a base station is provided. The base station serves as a primary base station of inter-base station carrier aggregation and includes a sending unit, a receiving unit and a processing unit. The sending unit is configured to send a data transmission parameter to a secondary base station; the processing unit is configured to send, through the sending unit in a downlink data transmission process, downlink data to the secondary base station according to the data transmission parameter, so as to send the downlink data to a user equipment through the secondary base station; or the processing unit is configured to receive, through the receiving unit in an uplink data transmission process, uplink data that is received by the secondary base station according to the data transmission parameter.

In a first possible implementation of the fourth aspect, the data transmission parameter includes a data packet size.

With reference to the first possible implementation of the fourth aspect, in a second possible implementation of the fourth aspect, the processing unit is specifically configured to, generate a downlink data packet according to the data packet size, and send, through the sending unit in the downlink data transmission process, the downlink data packet to the secondary base station, so as to send the downlink data packet to the user equipment through the secondary base station.

With reference to the fourth aspect or the first or the second possible implementation of the fourth aspect, in a third possible implementation of the fourth aspect, the data transmission parameter includes a modulation and coding scheme.

With reference to the fourth aspect or one of the first to the third possible implementations of the fourth aspect, in a fourth possible implementation of the fourth aspect, the data transmission parameter includes resource information.

With reference to the fourth aspect or one of the first to the fourth possible implementations of the fourth aspect, in a fifth possible implementation of the fourth aspect, the data transmission parameter includes a maximum quantity of transmission times or a maximum quantity of retransmission times.

With reference to the fifth possible implementation of the fourth aspect, in a sixth possible implementation of the fourth aspect, the maximum quantity of transmission times is one.

With reference to the fifth possible implementation of the fourth aspect, in a seventh possible implementation of the fourth aspect, the maximum quantity of transmission times is two, or the maximum quantity of retransmission times is one.

With reference to the fourth aspect or one of the first to the seventh possible implementations of the fourth aspect, in an eighth possible implementation of the fourth aspect, the sending unit is further configured to send a configuration parameter to the user equipment, so that the user equipment feeds back a reception condition of the downlink data or retransmits the uplink data according to the configuration parameter.

With reference to the eighth possible implementation of the fourth aspect, in a ninth possible implementation of the fourth aspect, the configuration parameter includes a resource parameter.

With reference to the eighth possible implementation of the fourth aspect, in a tenth possible implementation of the fourth aspect, the configuration parameter is the same as the data transmission parameter sent to the secondary base station.

With reference to the fourth aspect or one of the first to the tenth possible implementations of the fourth aspect, in an eleventh possible implementation of the fourth aspect, the processing unit is further configured to send, through the sending unit in the downlink data transmission process, the downlink data to the secondary base station based on maximum transmission time intervals (TTIs), and where the maximum TTIs refer to TTIs that are required when the primary base station assumes that the secondary base station sends each data packet at a maximum quantity of retransmission times or a maximum quantity of transmission times to complete the sending of the data packet.

With reference to the fourth aspect or one of the first to the eleventh possible implementations of the fourth aspect, in a twelfth possible implementation of the fourth aspect, the processing unit is further configured to receive, through the receiving unit when an amount of data buffered in the secondary base station exceeds a threshold and maintains exceeding the threshold for a period of time, status information that is of data transmission and sent by the secondary base station; and the processing unit is further configured to adjust downlink data transmission according to the status information.

With reference to the fourth aspect or one of the first to the twelfth possible implementations of the fourth aspect, in a thirteenth possible implementation of the fourth aspect, in the downlink data transmission process, the processing unit is further configured to receive, through the receiving unit, acknowledgement information fed back by the user equipment, the acknowledgement information is also fed back to the secondary base station, and an HARQ retransmission is performed by the secondary base station; and the processing unit is further configured to reduce a speed of sending the downlink data to the secondary base station when the acknowledgement information is NACK.

With reference to the fourth aspect or one of the first to the twelfth possible implementations of the fourth aspect, in a fourteenth possible implementation of the fourth aspect, in the downlink data transmission process, the processing unit is further configured to receive, through the receiving unit, acknowledgement information fed back by the user equipment; and the processing unit is further configured to perform an HARQ retransmission when the acknowledgement information is NACK.

With reference to the fourth aspect or one of the first to the fourteenth possible implementations of the fourth aspect, in a fifteenth possible implementation of the fourth aspect, the sending unit is further configured to send a measurement parameter of the secondary base station to the user equipment; the receiving unit is further configured to receive a measurement result reported by the user equipment directly or through the secondary base station, where the measurement result is obtained after the user equipment performs measurement according to the measurement parameter; and the processing unit is further configured to configure or adjust the data transmission parameter according to the measurement result.

In a fifth aspect, a base station is provided. The base station serves as a secondary base station of inter-base station carrier aggregation and includes a sending unit, a receiving unit and a processing unit. The receiving unit is configured to receive a data transmission parameter sent by a primary base station; the processing unit is configured to receive, through the receiving unit in a downlink data transmission process, downlink data that is sent by the primary base station according to the data transmission parameter, and send, through the sending unit in the downlink data transmission process, the downlink data to a user equipment; or the processing unit is configured to receive, through the receiving unit in an uplink data transmission process, uplink data according to the data transmission parameter, and send, through the sending unit in the uplink data transmission process, the uplink data to the primary base station.

In a first possible implementation of the fifth aspect, the data transmission parameter includes a data packet size.

With reference to the first possible implementation of the fifth aspect, in a second possible implementation of the fifth aspect, the downlink data that is sent by the primary base station according to the data transmission parameter and is received by the receiving unit is a downlink data packet generated by the primary base station according to the data packet size.

With reference to the fifth aspect or the first or the second possible implementation of the fifth way, in a third possible implementation of the fifth aspect, the data transmission parameter includes a modulation and coding scheme. The processing unit is specifically configured to send, through the sending unit, the downlink data to the user equipment according to the modulation and coding scheme; or the processing unit is specifically configured to send, through the sending unit, the uplink data to the primary base station according to the modulation and coding scheme.

With reference to the fifth aspect or one of the first to the third possible implementations of the fifth aspect, in a fourth possible implementation of the fifth aspect, the data transmission parameter includes resource information. The processing unit is specifically configured to send, through the sending unit to the user equipment, the downlink data on a downlink resource determined by the resource information; or the processing unit is specifically configured to schedule an uplink resource determined by the resource information and receive, through the receiving unit, the uplink data on the determined uplink resource.

With reference to the fifth aspect or one of the first to the fourth possible implementations of the fifth aspect, in a fifth possible implementation of the fifth aspect, the data transmission parameter includes a maximum quantity of transmission times or a maximum quantity of retransmission times; and the processing unit is further configured to discard, in the downlink data transmission process, a data packet of which a quantity of transmission times reaches the maximum quantity of transmission times or a data packet of which a quantity of retransmission times reaches the maximum quantity of retransmission times.

With reference to the fifth possible implementation of the fifth aspect, in a sixth possible implementation of the fifth aspect, the maximum quantity of transmission times is one.

With reference to the fifth possible implementation of the fifth aspect, in a seventh possible implementation of the fifth aspect, the maximum quantity of transmission times is two, or the maximum quantity of retransmission times is one.

With reference to the fifth aspect or one of the first to the seventh possible implementations for the fifth aspect, in an eighth possible implementation of the fifth aspect, in the downlink data transmission process, the processing unit is further configured to receive, through the receiving unit and based on maximum transmission time intervals (TTIs), data sent by the primary base station, and where the maximum TTIs refer to TTIs that are required when the primary base station assumes that the secondary base station sends each data packet at a maximum quantity of retransmission times or a maximum quantity of transmission times to complete the sending of the data packet.

With reference to the fifth aspect or one of the first to the eighth possible implementations of the fifth aspect, in a ninth possible implementation of the fifth aspect, the base station further includes a storing unit configured to buffer the downlink data sent by the primary base station to the secondary base station; and the processing unit is further configured to send, through the sending unit when an amount of data buffered in the storing unit exceeds a threshold and maintains exceeding the threshold for a period of time, status information of data transmission to the primary base station, so that the primary base station adjusts downlink data transmission according to the status information.

In a sixth aspect, a user equipment is provided The user equipment includes a sending unit, a receiving unit and a processing unit. The receiving unit is configured to receive a configuration parameter sent by a primary base station; the processing unit is configured to feed back, through the sending unit when the receiving unit receives downlink data sent by a secondary base station in a downlink data transmission process, a reception condition of the downlink data according to the configuration parameter; or the processing unit is configured to send, through the sending unit in an uplink data transmission process, uplink data to a secondary base station according to the configuration parameter.

In a first possible implementation of the sixth aspect, the configuration parameter includes a resource parameter. The processing unit is specifically configured to feed back, through the sending unit, the reception condition of the downlink data on a resource determined by the resource parameter; or the processing unit is specifically configured to send, through the sending unit, the uplink data on a resource determined by the resource parameter to the secondary base station.

With reference to the sixth aspect or the first possible implementation of the sixth aspect, in a second possible implementation of the sixth aspect, in the downlink data transmission process, the processing unit is further configured to feed back, through the sending unit, acknowledgement information to both the primary base station and the secondary base station, so that when the acknowledgement information is NACK, the secondary base station performs an HARQ retransmission and the primary base station reduces a speed of sending downlink data to the secondary base station.

With reference to the sixth aspect or the first possible implementation of the sixth aspect, in a third possible implementation of the sixth aspect, in the downlink data transmission process, the processing unit is further configured to feed back, through the sending unit, acknowledgement information to the primary base station, so that when the acknowledgement information is NACK, the primary base station performs an HARQ retransmission.

With reference to the sixth aspect or one of the first to the third possible implementations of the sixth aspect, in a fourth possible implementation of the sixth aspect, the receiving unit is further configured to receive a measurement parameter that is of the secondary base station and sent by the primary base station. The user equipment further includes a measuring unit configured to perform a measurement on a downlink channel of the secondary base station according to the measurement parameter; and the sending unit is further configured to report a measurement result to the primary base station directly or through the secondary base station.

In a seventh aspect, a computer program product including a computer readable medium is provided, where the computer readable medium includes a set of program codes for performing a method according the first aspect or any one of the implementations of the first aspect.

In an eighth aspect, a computer program product including a computer readable medium is provided, where the computer readable medium includes a set of program codes for performing a method according to the second aspect or any one of the implementations of the second aspect.

In a ninth aspect, a computer program product including a computer readable medium is provided, where the computer readable medium includes a set of program codes for performing a method according to the third aspect or any one of the implementations of the third aspect.

In a tenth aspect, a communications system is provided. The system includes: a primary base station according to the fourth aspect or any one of the implementations of the fourth aspect, a secondary base station according to the fifth aspect or any one of the implementations of the fifth aspect and the user equipment according to the sixth aspect or any one of the implementations of the sixth aspect, where the primary base station provides coverage and mobility management for the user equipment, and the secondary base station provides data transmission for the user equipment.

As can be seen from the above method, device and system, a primary base station configures a data transmission parameter for a secondary base station, to assist the secondary base station to perform uplink and downlink data transmission for a UE. In this way, the primary base station and the secondary base station transmit and receive data according to the same data transmission parameter, and there is no need to perform extra processing on the data transmitted and received by the secondary base station, that is, the secondary base station can merely reserve simple buffering, encapsulating and transceiving functions, or even merely reserve buffering and transceiving functions, so that a protocol design of the secondary base station is simplified, and cost of the secondary base station, especially cost of a micro base station serving as the secondary base station is reduced.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

Protocol implementation of an existing secondary base station is complicated. A basic protocol stack and functions of a common base station are necessary to be implemented even in a micro base station; so cost of the micro base station is difficult to be reduced. Taking the above into consideration, in the following embodiments, a primary base station configures a data transmission parameter for a secondary base station, to assist the secondary base station to perform uplink and downlink data transmission for a UE. In this way, the primary base station and the secondary base station transmit and receive data according to the same data transmission parameter, and there is no need to perform extra processing on the data transmitted and received by the secondary base station, that is, the secondary base station may merely reserve simple buffering, encapsulating, and transceiving functions, or even merely reserve buffering and transceiving functions, so that a protocol design of the secondary base station is simplified, and cost of the secondary base station, especially cost of a micro base station serving as the secondary base station is reduced. The following gives detailed description with reference to specific embodiments.

Figure 1:
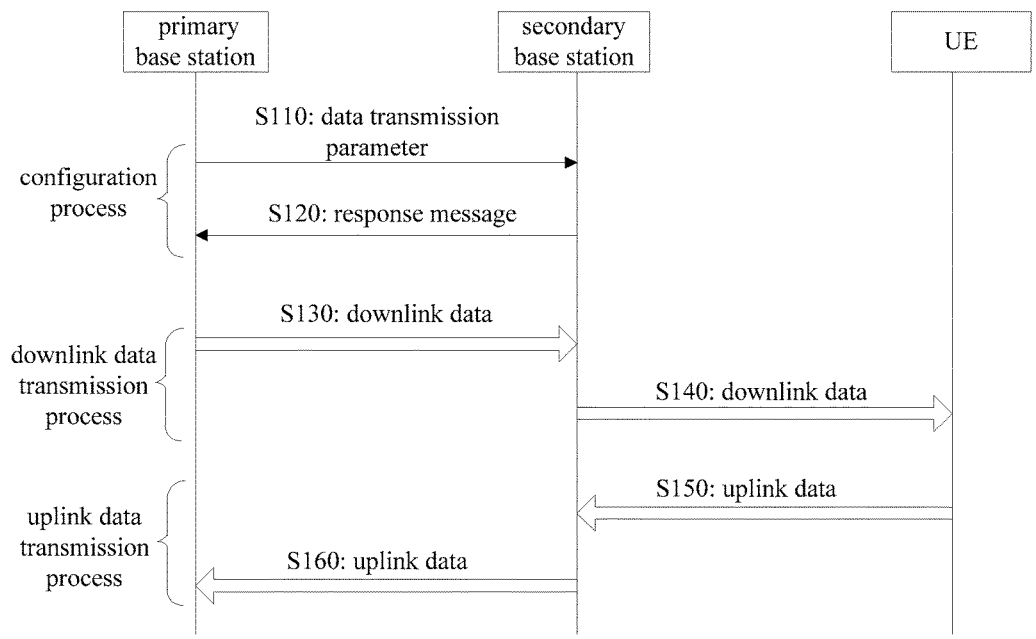
FIG. 1 is a flowchart of a data transmission method according to a first embodiment of the present invention.

Please refer to FIG. 1, which is a flowchart of a data transmission method according to a first embodiment of the present invention. As shown in FIG. 1, the method includes the following step:

S110: A primary base station sends a data transmission parameter to a secondary base station.

The primary base station may send the data transmission parameter to the secondary base station by using an X2 interface message. However, the present invention is not limited thereto, the data transmission parameter may be sent to the secondary base station by using other wire transmission manners or through an air interface. In a word, the manner used by the primary base station to send the data transmission parameter to the secondary base station is not limited in the present invention.

In addition, the data transmission parameter may be preset in the primary base station, or may be configured for the primary base station by an operation, administration and maintenance (Operation, Administration and Maintenance, OAM) entity, which is not limited in the present invention. In addition, the primary base station may preset an initial data transmission parameter, and then adjusts the data transmission parameter according to a measurement result reported by a UE; alternatively, the OAM entity configures an initial data transmission parameter for the primary base station, and then the primary base station or the OAM entity adjusts the data transmission parameter according to a measurement result reported by a UE.

The secondary base station may send a response message to the primary base station after receiving the data transmission parameter, to notify the primary base station that the data transmission parameter has been received. Certainly, the secondary base station may not send any response message to the primary base station and the primary base station believes that the data transmission parameter has been received successfully by default. For example, when the primary base station sends the data transmission parameter by using a wire manner (e.g., sends the data transmission parameter by using the X2 interface message), the secondary base station may not send the response message since the wire transmission is relatively reliable; certainly, the secondary base station may send the response message.

That is to say, when the secondary base station sends the response message to the primary base station, the method shown in FIG. 1 further includes:

step S120: The secondary base station sends the response message to the primary base station.

Specifically, the response message may be sent to the primary base station by using an X2 interface message; however the present invention is not limited thereto, the response message may be sent to the primary base station by using other wire transmission manners or through an air interface.

The above describes a process where the primary base station configures a data transmission parameter for the secondary base station. The secondary base station may send a response message to the primary base station after receiving the data transmission parameter, to notify the primary base station that the data transmission parameter has been received, i.e., configuration is completed. Certainly, the response message may not be sent, and the primary base station believes that the data transmission parameter has been received successfully by default after sending the data transmission parameter, i.e., the configuration is completed. After the configuration is completed, the secondary base station may transmit uplink data and downlink data by using the data transmission parameter.

For downlink data transmission, the primary base station packages and sends downlink data to be sent to the secondary base station according to the data transmission parameter. After receiving a data packet from the primary base station, the secondary base station buffers the data packet, and performs data transmission according to the data transmission parameter sent by the primary base station. That is to say, the method shown in FIG. 1 further includes:

S130: The primary base station sends downlink data to the secondary base station according to the data transmission parameter.

For example, the primary base station generates a downlink data packet according to the data transmission parameter and sends the downlink data packet to the secondary base station.

S140: The secondary base station sends the downlink data to a UE after receiving the downlink data from the primary base station.

For example, after receiving the downlink data packet from the primary base station, the secondary base station buffers the data packet and sends the downlink data packet to the UE according to the data transmission parameter, where according to different data transmission parameters, the secondary base station may need to encapsulate the downlink data packet before sending the downlink data packet to the UE, which is to be described in detail in subsequent embodiments.

For uplink data transmission, when the UE needs to send data, the secondary base station receives uplink data of the UE according to the data transmission parameter. After receiving the uplink data of the UE successfully, the secondary base station sends the data to the primary base station. That is to say, the method in FIG. 1 further includes:

S150: The secondary base station receives the uplink data of the UE according to the data transmission parameter.

For example, when the UE needs to send data, the UE sends a scheduling request (scheduling request, SR) to the secondary base station; after receiving the SR, the secondary base station schedules an uplink resource according to the data transmission parameter, to receive an uplink data packet of the UE.

S160: The secondary base station sends the received uplink data to the primary base station.

For example, after receiving the uplink data packet from the UE, the secondary base station may directly send the data packet to the primary base station, or may buffer the data packet and then send the data packet to the primary base station, where according to different data transmission parameters, the secondary base station may need to de-encapsulate the uplink data packet before sending the uplink data packet to the primary base station, which is to be described in detail in subsequent embodiments.

Figure 2:
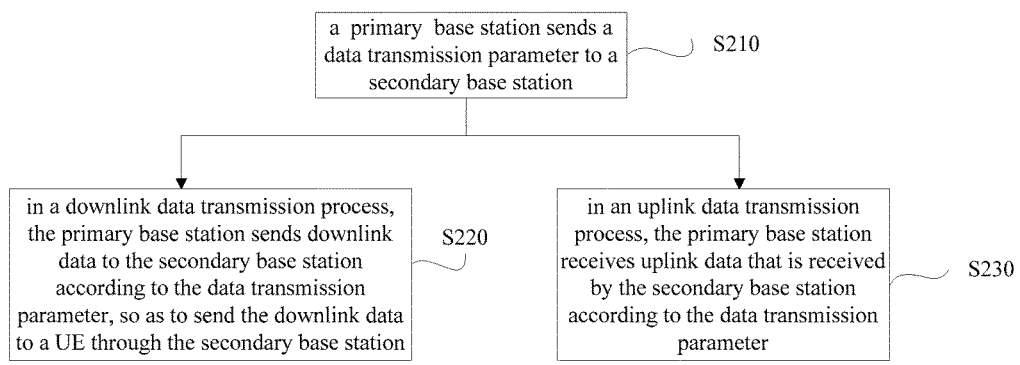
FIG. 2 is a flowchart of another data transmission method according to the first embodiment of the present invention.

Accordingly, a data transmission method is provided according to the embodiment, the method is executed by the primary base station. As shown in FIG. 2, the method includes the followings steps:

S210: A primary base station sends a data transmission parameter to a secondary base station;

S220: In a downlink data transmission process, the primary base station sends downlink data to the secondary base station according to the data transmission parameter, so as to send the downlink data to a UE through the secondary base station; or

S230: In an uplink data transmission process, the primary base station receives uplink data that is received by the secondary base station according to the data transmission parameter.

Figure 3:
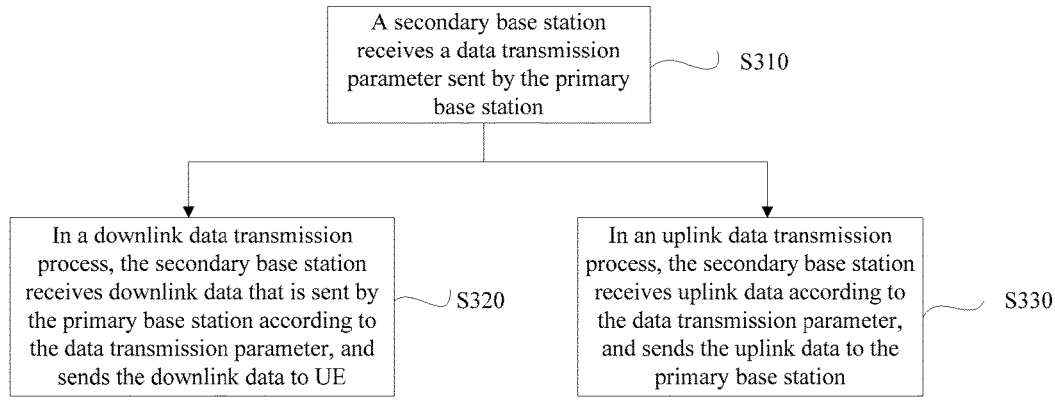
FIG. 3 is a flowchart of another data transmission method according to the first embodiment of the present invention.

A data transmission method is further provided according to the embodiment, the method is executed by the secondary base station. As shown in FIG. 3, the method includes the following steps:

S310: A secondary base station receives a data transmission parameter sent by a primary base station;

S320: In a downlink data transmission process, the secondary base station receives downlink data that is sent by the primary base station according to the data transmission parameter, and sends the downlink data to a UE; or

S330: In an uplink data transmission process, the secondary base station receives uplink data according to the data transmission parameter, and sends the uplink data to the primary base station.

In the embodiment, the primary base station configures the data transmission parameter for the secondary base station, to assist the secondary base station to perform uplink and downlink data transmission for the UE. In this way, the primary base station and the secondary base station transmit and receive data according to the same data transmission parameter, and there is no need to perform extra processing on the data transmitted and received by the secondary base station, that is, the secondary base station may merely reserve simple buffering, encapsulating, and transceiving functions, or even merely reserve buffering and transceiving functions, so that a protocol design of the secondary base station is simplified, and cost of the secondary base station, especially cost of a micro base station serving as the secondary base station is reduced.

In a second embodiment of the present invention, the data transmission parameter may include a data packet size, i.e., a size of data each time transmitted by the secondary base station to the UE (for example, a transmission block size, TB Size). In this case, when the primary base station needs to send downlink data, the primary base station generates a downlink data packet having a corresponding size according to the data packet size, and sends the downlink data packet to the secondary base station; and the secondary base station sends data to the UE by using a data packet having the same size. So, the processing on the data packet may be simplified, or even the data packet may be directly forwarded to the UE without any processing.

According to different protocol architectures, the primary base station generates the downlink data packet in different manners.

Figure 4:
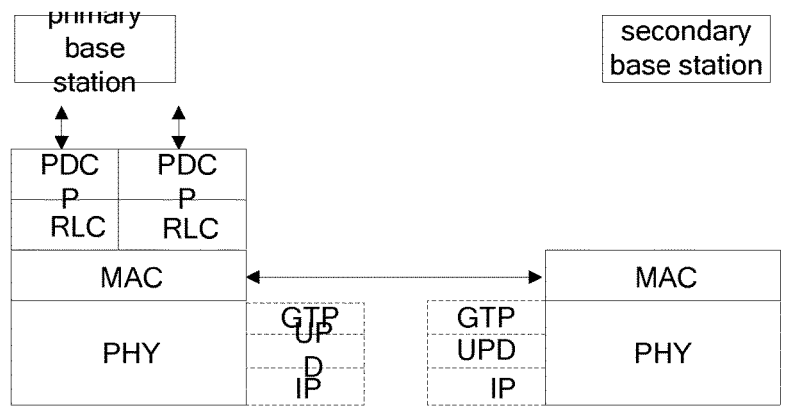
FIG. 4 is a schematic diagram of a protocol stack of a primary base station and a protocol stack of a secondary base station according to a second embodiment of the present invention.

For example, FIG. 4 shows a first manner, where an arrow represents an uplink/downlink data flow (UL/DL data flow). An MAC layer of the primary base station generates an MAC protocol data unit (protocol data unit, PDU) having a corresponding size according to the data packet size, and sends the MAC PDU to the secondary base station for buffering and transmission.

Figure 5:
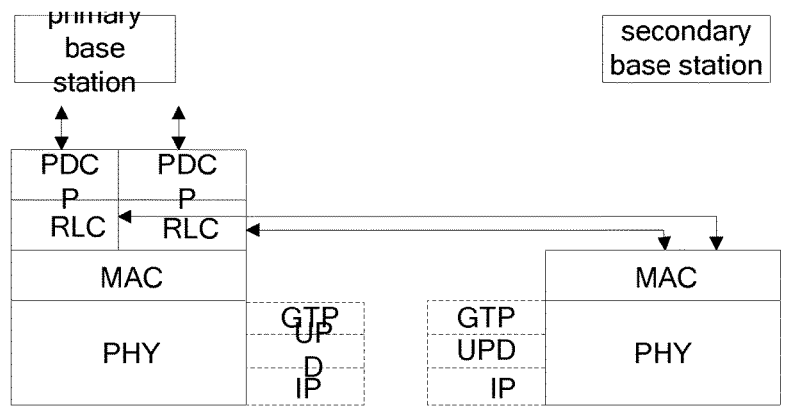
FIG. 5 is a schematic diagram of another protocol stack of the primary base station and another protocol stack of the secondary base station according to the second embodiment of the present invention.

FIG. 5 shows a second manner, where an arrow represents an uplink/downlink data flow (UL/DL data flow). An MAC layer or an RLC layer of the primary base station makes one or more RLC entities to assemble data into one or more RLC PDUs according to the data packet size, and sends the one or more RLC PDUs to the secondary base station for buffering. The secondary base station encapsulates the one or more RLC PDUs into an MAC PDU for transmission. The size of the MAC PDU, that is of the secondary base station and is formed by encapsulating the one or more RLC PDUs, is in accordance with the configured data packet size. Padding may be performed during the encapsulating process performed by the secondary base station.

In a downlink data transmission process, when data received by the secondary base station from the primary base station is an MAC PDU, the secondary base station may send the MAC PDU to the UE without encapsulating; or the secondary base station buffers the MAC PDU for a period of time and then sends the MAC PDU to the UE. When the data received from the primary base station is an RLC PDU, the RLC PDU needs to be encapsulated into an MAC PDU; or the RLC PDU is buffered for a period of time and then encapsulated into an MAC PDU; or the RLC PDU is encapsulated into an MAC PDU, the MAC PDU is buffered for a period of time; and then the MAC PDU is sent to the UE. During sending data, the data may be sent according to a preset configuration of the secondary base station or a configuration of the primary base station. The configuration of the primary base station may be sent to the secondary base station in a manner of a data transmission parameter. For example, when the secondary base station pre-configures a parameter related to a semi-persistent scheduling (semi-persistent scheduling, SPS) or the primary base station configures a parameter related to the SPS (i.e., the data transmission parameter includes a parameter related to the SPS), the secondary base station may activate an SPS resource at the secondary base station of the UE and sends the data to the UE by using the SPS resource. It should be noted that, a command for SPS activation may be sent by the primary base station to the UE, i.e., the primary base station performs an inter-base station SPS activation; or the command for SPS activation may be sent by the secondary base station to the UE. For another example, when the secondary base station pre-configures a scheduling moment or the primary base station configures a scheduling moment (i.e., the data transmission parameter includes the scheduling moment), the secondary base station sends the data to the UE at the corresponding moment. For another example, when the secondary base station pre-configures a specific physical resource or the primary base station configures a specific physical resource (i.e., the data transmission parameter includes physical resource information), the secondary base station sends the data to the UE by using the physical resource which is pre-configured by the secondary base station or is configured by the primary base station. For another example, when the secondary base station pre-configures a specific modulation and coding scheme (modulation and coding scheme, MCS) or the primary base station configures a specific MCS (i.e., the data transmission parameter includes MCS information), the secondary base station sends the data to the UE by using the MCS.

In the uplink data transmission process, after receiving the uplink data (i.e., an MAC PDU) of the UE successfully, the secondary base station may directly send the uplink data to the primary base station, or the secondary base station de-encapsulates the uplink data into an RLC PDU and then sends the RLC PDU to the primary base station.

It can be seen that, in the first manner, the secondary base station merely needs to receive, buffer and send the downlink data, and to receive and send the uplink data, and does not need to perform extra processing on the data. In the second manner, the secondary base station only needs to receive, buffer, encapsulate and send the downlink data, and to receive and send the uplink data, and does not need to perform extra processing on the data. In addition as shown in the figures, the secondary base station merely needs to implement an MAC layer protocol and a physical (PHY) layer protocol and does not need to implement a packet data convergence protocol (packet data convergence protocol, PDCP) and an RLC layer protocol, thereby simplifying a protocol stack of the secondary base station and reducing the cost of the secondary base station.

A data transmission channel between the primary base station and the secondary base station may be a general packet radio service tunnel protocol (GPRS (general packet radio service) tunnel protocol, GTP) channel shown in Figures. For the transmission in the fire manner, one GTP channel is established between the primary base station and the secondary base station for one UE. For the transmission in the second manner, multiple GTP channels need to be established between the primary base station and the secondary base station for one UE, to distinguish RLC entities, logical channels (logical channels, LCHs), or radio bearers (Radio Bearers, RBs), to which different RLC PDUs belong.

It should be noted that, the configured data packet size may be set as the data transmission parameter and sent to the secondary base station; or may be preset in the primary base station and the secondary base station and do not need to be transmitted by using the data transmission parameter. Certainly, the data transmission parameter may include another parameter, such as resource information or MCS information.

In a third embodiment of the present invention, the data transmission parameter may include an MCS, i.e., the MCS which is used each time the secondary base station transmits data for the UE. In a downlink data transmission process, the secondary base station sends downlink data to the UE by using the MCS. In an uplink data transmission process, the secondary base station schedules uplink data of the UE by using the MCS. It can be seen that when the parameter is configured, the secondary base station may perform processing, such as, demodulating, decoding, modulating and encoding, on a data packet by using the configured MCS, thereby simplifying the processing of the secondary base station and reducing the cost of the secondary base station. Certainly, the MCS of the primary base station and the secondary base station may be appointed in advance and the parameter does not need to be transmitted.

In a fourth embodiment of the present invention, the data transmission parameter may include resource information, i.e., information of a resource for the data transmission from the secondary base station to the UE. The resource information includes, for example, a time domain resource (e.g., occasion, occasion), a frequency domain resource (e.g., a physical resource block, PRB), a period, a scheduling request resource of the secondary base station and so on. Specifically, the time domain resource may be, for example, absolute time or a certain sub-frame in a certain radio frame, and a corresponding time domain resource used each time the secondary base station transmits data for the UE may be determined in combination with the period. The period may be a period of a dynamic scheduling or a period of the SPS, for example, an uplink SPS period or a downlink SPS period.

For example, in the downlink data transmission process, when the data transmission parameter includes the parameter related to the SPS (i.e., the primary base station configures the parameter related to the SPS), the secondary base station may activate an SPS resource of the UE at the secondary base station and send the data to the UE by using the SPS resource. For another example, when the data transmission parameter includes the scheduling moment (i.e., the primary base station configures the scheduling moment), the secondary base station may send the data to the UE at a corresponding moment. For another example, when the data transmission parameter includes the specific physical resource (i.e., the primary base station configures the specific physical resource), the data is sent to the UE by using the physical resource. It should be noted that, the command for SPS activation may be sent by the primary base station to the UE, i.e., the primary base station performs an inter-base station SPS activation; or the command for SPS activation may be sent by the secondary base station to the UE.

In the uplink data transmission process, when the UE needs to send data, the UE sends an SR to the secondary base station; after receiving the SR, the secondary base station schedules an uplink resource according to resource information in the data transmission parameter, to receive an uplink data packet sent by the UE. For example, when the data transmission parameter includes the parameter related to the SPS (i.e. the primary base station configures the parameter related to the SPS), the secondary base station may activate the SPS resource of the UE at the secondary base station and transmit the uplink data of the UE by using the SPS resource. For another example, when the data transmission parameter includes the scheduling moment (i.e., the primary base station configures the scheduling moment), the secondary base station schedules the uplink data of the UE at a corresponding moment. For another example, when the data transmission parameter includes the specific physical resource (i.e., the primary base station configures the specific physical resource), the secondary base station schedules uplink data of the UE by using the physical resource. It should be noted that, the command for SPS activation may be sent by the primary base station to the UE, i.e., the primary base station performs an inter-base station SPS activation; or the command for SPS activation may be sent by the secondary base station to the UE.

It should be noted that, the above configuration for a resource parameter is only an example, and is not intended to limit the present invention. Specifically, the data transmission parameter may include one or more resource parameters; or the data transmission parameter may not include any resource parameter and an uplink and downlink transmission resource for the secondary base station is configured in advance. Those skilled in the art may perform the configuration based on actual needs.

In a fifth embodiment of the present invention, the data transmission parameter may include a maximum quantity of transmission times or a maximum quantity of retransmission times, i.e., a maximum quantity of transmission times or a maximum quantity of retransmission times of a hybrid automatic repeat request (hybrid automatic repeat request, HARQ) used by the secondary base station to transmit data.

After receiving the downlink data from the secondary base station, the UE performs an uplink feedback according to a reception condition. The feedback may be performed based on a pre-configured resource or according to a configuration of the primary base station, which is to be described in detail in subsequent embodiments and is not limited in the embodiment.

If the secondary base station receives a feedback that the UE does not receive the data successfully, the secondary base station may perform an HARQ retransmission. A resource for retransmission, an MCS or a redundancy version may be configured in the secondary base station in advance, or may be configured by the primary base station by using the data transmission parameter. The secondary base station discards a data packet when the secondary base station performs HARQ transmission or HARQ retransmission on the certain data for times of a configured maximum value.

Optionally, new data transmission of the secondary base station may be controlled by the primary base station by using the data transmission parameter, and retransmission may be performed autonomously to some extent, for example, the MCS, resource and time may be selected autonomously; certainly, the new data transmission may be performed autonomously to some extent, and the retransmission may be controlled by the primary base station by using the data transmission parameter; which are not limited in the present invention.

It should be noted that, possible information included in the data transmission parameter is described in the second embodiment to the fifth embodiment, i.e., the data transmission parameter may include the parameter or parameters described in one or more of the second to the fifth embodiments, or may include the parameters described in all the embodiments. Those skilled in the art may configure the content of the data transmission parameter according to what is noted above. The more parameters are configured by the primary base station for the secondary base station by transmitting the data transmission parameter, the less contents are required to be preset in the secondary base station, which is more beneficial to reduce the cost of the secondary base station. Considering that the more contents the data transmission parameter includes, the more complicated the contents are, more transmission resources are required and more limitations are exerted to the secondary base station; hence, the contents of the data transmission parameter may be set according to a comprehensive consideration, which is not limited in the present invention.

Considering a case where the primary base station and the secondary base station perform a joint scheduling (including a joint reception or a joint sending), the above data transmission parameter may be transmitted by using a scheduling command. A joint scheduling method provided by the embodiment includes: sending, by the primary base station to the UE, a scheduling command, which carries the above data transmission parameter, for example, including one or more of the data packet size, the MCS and the resource information, so as to inform the UE of information, such as the data packet size, the MCS or the physical resource, used in data transmission and reception between the primary base station and the secondary base station. Therefore, the UE may send or receive data in the primary base station and the secondary base station according to the scheduling command.

In a first manner, the primary base station and the secondary base station transmit a same data content by using a same physical resource or different physical resources. In this way, reliability of data transmission may be enhanced.

In a second manner, the primary base station and the secondary base station transmit different contents by using a same physical resource or different resources. In this way, a speed of information transmission may be increased.

In a third manner, the primary base station and the secondary base station use a same resource to transmit a same content and use a same reference signal. In this way, reliability of data transmission may be enhanced.

In a fourth manner, the primary base station and the secondary base station send a scheduling command simultaneously, and use a same resource to transmit a same content. In this way, reliability for transmitting the scheduling command may be enhanced. The scheduling command may be transmitted by using a EPDCCH or a PDCCH, which is not limited here. The fourth manner may be used in combination with the above three manners, to enhance transmission of the scheduling command and transmission of the data.

In addition, when the primary base station and the secondary base station schedule jointly, the data transmission parameter may include information of a reference signal, for example, information of a demodulation reference signal (demodulation reference signal, DMRS), and the reference signal is used in the joint reception or the joint sending of the scheduling command or the data. For example, when the primary base station configures, for the secondary base station or for the UE, the information of a reference signal in the joint scheduling, the UE uses the reference signal to process received data or data to be sent, to increase reliability of information transmission. For another example, the data transmission parameter may include a data retransmission parameter, for example, a time interval N between a data retransmission and a new transmission or between two retransmissions, such as 6 TTIs, 7TTIs, 8TTIs or 9TTIs, the value of N is not limited here. For another example, the data transmission parameter may indicate that a resource used in the retransmission is the same as that used in the new transmission. These parameters may be fixed in advance according to a protocol. Therefore, the primary base station and the secondary base station may perform a joint scheduling by using same information (for example, the information of a reference signal or the data retransmission parameter).

For another example, when the primary base station and the secondary base station jointly send the scheduling command, the data transmission parameter may include a configuration parameter of a scheduling command, for example a configuration parameter of a scheduling command for a physical downlink control channel (physical downlink control channel, PDCCH) or an enhanced physical downlink control channel (EPDCCH). The configuration parameter may include one piece of or all of the following information: physical resource information, time information, information of a used reference signal, such as a DMRS, and so on. Therefore, the primary base station and the secondary base station perform joint scheduling by using the same configuration parameter of a scheduling command Optionally, the UE may report, to the primary base station, information of capability on supporting intra-frequency joint reception (i.e., the primary base station may firstly receive the information that is of the capability on supporting the intra-frequency joint reception and reported by the UE). For example, capability on simultaneously receiving a same scheduling command or different scheduling commands from the primary base station and the secondary base station is reported, to assist the primary base station to configure a parameter for the joint scheduling and to perform the joint scheduling. In a sixth embodiment of the present invention, the primary base station may send a data transmission parameter to the UE. The data transmission parameter sent to the UE may be the same as or different from the data transmission parameter sent to the secondary base station. Hereinafter the data transmission parameter sent to the UE is referred to as a configuration parameter to be distinguished from the data transmission parameter sent to the secondary base station.

Figure 6:
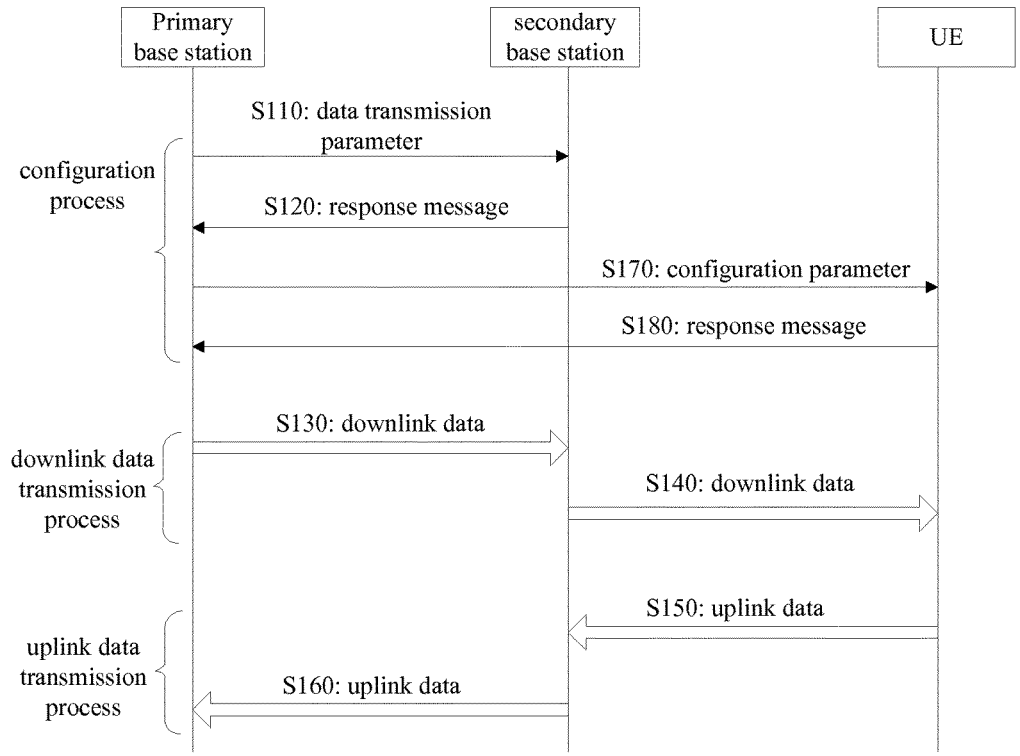
FIG. 6 is a flowchart of a data transmission method according to a sixth embodiment of the present invention.

Please refer to FIG. 6, which is a flowchart of a data transmission method according to a sixth embodiment of the present invention. Compared with the first embodiment, the configuration process further includes a configuration for the UE. That is to say, as shown in FIG. 6, the method further includes the following step:

S170: The primary base station sends a configuration parameter to the UE.

The primary base station may send the configuration parameter to the UE by using a radio resource control (radio resource control, RRC) message (e.g., an RRC reconfiguration message), an MAC layer message (for example, a media access control control element (media access control control element, MAC CE)) or a PHY layer message. Certainly, the configuration parameter may be sent by using other manners. The manner for sending the configuration parameter from the primary base station to the UE is not limited in the present invention.

In addition, the configuration parameter may be preset in the primary base station, or may be configured for the primary base station by an OAM entity, which is not limited in the present invention. In addition, the primary base station may preset an initial configuration parameter, and then adjusts the configuration parameter according to a measurement result reported by the UE. Alternatively, the OAM entity configures the initial configuration parameter for the primary base station, and then the primary base station or the OAM entity adjusts the configuration parameter according to a measurement result reported by the UE.

After receiving the configuration parameter, the UE may send a response message to the primary base station to notify the primary base station that the configuration parameter has been received. Certainly, the UE may not send any response message to the primary base station and the primary base station believes that the configuration parameter has been received successfully by default.

That is to say, when the UE sends the response message to the primary base station, the method shown in FIG. 6 further includes:

step S180: the UE sends the response message to the primary base station.

Specifically, the response message may be sent by using an RRC message, an MAC layer message or a PHY layer message.

The above describes a process where the primary base station configures a parameter for the UE. The UE may send a response message to the primary base station after receiving the configuration parameter, to notify the primary base station that the configuration parameter has been received, i.e., configuration is completed. Certainly, the UE may not send any response message, and the primary base station believes that the configuration parameter has been received successfully by default after sending the configuration parameter, i.e., the configuration is completed. After the configuration is completed, the UE may feed back a reception condition of the downlink data by using the configuration parameter.

Furthermore, the configuration parameter includes a resource parameter. The resource parameter may be the same as or different from the resource parameter which is configured for the secondary base station by the primary base station and used is for scheduling the uplink data of the UE by the secondary base station.

In the downlink data transmission process, the UE performs an uplink feedback according to a reception condition after receiving the downlink data from the secondary base station. The primary base station may configure a feedback resource by using the configuration parameter. For example, the UE performs the feedback by using the feedback resource configured by the primary base station for the UE after receiving downlink data transmitted by using a downlink SPS manner After receiving downlink data transmitted by using a downlink dynamic scheduling manner, the UE performs the feedback by using a physical uplink control channel (physical uplink control channel, PUCCH) resource corresponding to a physical downlink control channel (physical downlink control channel, PDCCH) which is used by the secondary base station to schedule the downlink data.

When an uplink PUSCH resource exists at the time that the UE performs the feedback, the feedback may be performed by using the PUSCH resource. That is to say, the UE may need to transmit uplink data and a situation of the feedback performed for the downlink data simultaneously; and in this case, the PUSCH resource may also be used by the feedback information, or the feedback is stilled performed by using the PUCCH resource.

In the uplink data transmission process, when the UE needs to send data, the UE sends an SR to the secondary base station. After receiving the SR, the secondary base station schedules the uplink data of the UE according to the resource parameter configured by the primary base station. For example, when the primary base station has configured a parameter related to an SPS, an SPS resource at the secondary base station of the UE may be activated and the uplink data of the UE is scheduled by using the SPS resource. For another example, when the primary base station has configured a scheduling moment, the secondary base station schedules the uplink data of the UE at a corresponding moment. For another example, when the primary base station has configured a specific physical resource, the uplink data of the UE is scheduled by using the physical resource configured by the primary base station. Optionally, the condition that the UE needs to send data may be replaced with a condition that the UE needs to send data to the secondary base station, which is not limited here. Optionally, the sending, by the UE, the SR to the secondary base station to request the secondary base station to schedule the uplink data may be replaced with sending, by the UE, a request to the primary base station and instructing, by the primary base station, the secondary base station to perform a scheduling. Specifically, after receiving the SR sent by the UE, the primary base station sends an uplink data scheduling request to the secondary base station; or after receiving a BSR sent by the UE, the primary base station sends an uplink data scheduling request to the secondary base station, the uplink data scheduling request may further include an amount of data to be scheduled by the secondary base station.

The secondary base station sends a feedback to the UE according to a reception condition of the uplink data, and the UE performs an HARQ retransmission according to the feedback. The HARQ retransmission may be a non-adaptive retransmission or an adaptive retransmission, when the adaptive retransmission is performed, a retransmission resource, an MCS or a redundancy version may be configured in the secondary base station in advance; or may be configured by the primary base station by using the data transmission parameter; or may be determined autonomously by the secondary base station, for example, the resource, the MCS or the redundancy version is adjusted according to a current channel condition to increase reliability of data transmission.

Figure 7:
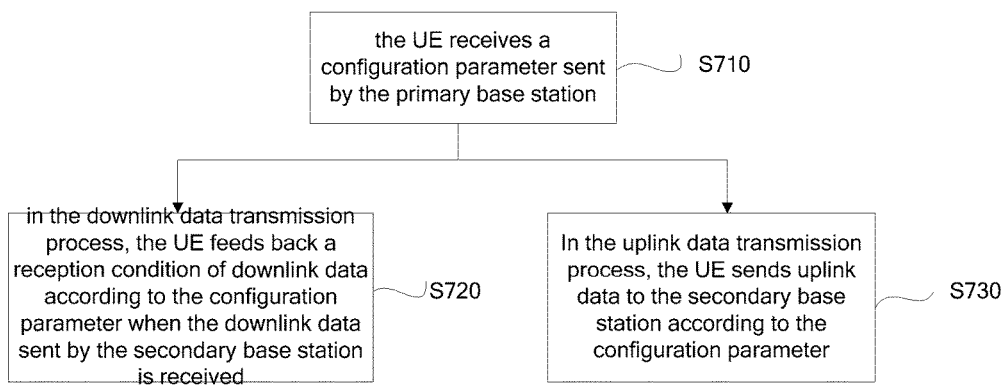
FIG. 7 is a flowchart of another data transmission method according to the sixth embodiment of the present invention.

A data transmission method is further provided according to the embodiment, which is executed by a UE. As shown in FIG. 7, the method includes the following steps:

S710: The UE receives a configuration parameter sent by a primary base station;

S720: In a downlink data transmission process, the UE feeds back, when downlink data sent by a secondary base station is received, a reception condition of the downlink data according to the configuration parameter; or S730, In an uplink data transmission process, the UE sends uplink data to the secondary base station according to the configuration parameter. For example, the UE transmits new uplink data according to the configuration parameter, i.e., transmits the uplink data for the first time; or the UE retransmits the uplink data according to the configuration parameter when the uplink data sent to the secondary base station needs to be retransmitted.

It should be noted that, when receiving the downlink data, the UE may feed back the reception condition of the downlink data according to the configuration parameter to only the secondary base station, or to only the primary base station, or to both the primary base station and the secondary base station.

It should be noted that, the primary base station may send a configuration parameter to the UE, and the configuration parameter is the same as the data transmission parameter sent to the secondary base station. In this way, the UE may know the configuration of the secondary base station and the UE may communicate with the secondary base station more efficiently. For example, when the data transmission parameter includes the data packet size, the UE may reduce overhead of a scheduling command of the secondary base station with knowledge of the data packet size. Furthermore, for the downlink data transmission, the UE may determine, according to the data size, whether an error occurs on the scheduling command of the secondary base station; and for the uplink data transmission, upper layer data may be encapsulated into an MAC PDU having a corresponding size in advance, or a scheduling request for the secondary base station is triggered only when a data packet size to be transmitted is greater than the configured data packet size. For another example, the overhead of the scheduling command of the secondary base station may be reduced when the data transmission parameter includes the MCS. For another example, the overhead of the scheduling command of the secondary base station may be reduced when the data transmission parameter includes resource information. For another example, when the data transmission parameter includes the maximum quantity of HARQ retransmission times, the UE may reach a consensus with the secondary base station when performing an uplink HARQ retransmission, thereby avoiding a resource conflict. For another example, when the data transmission parameter includes a scheduling request resource or a feedback resource, the scheduling request or the feedback sent by the UE can be received correctly by the secondary base station. Certainly, the configuration parameter may not be sent to the UE, and the UE performs a feedback autonomously.

In addition, more embodiments may be obtained by combining the sixth embodiment with one or more embodiments from the second to the fifth embodiments.

In a seventh embodiment of the present invention, the data transmission parameter may be configured or adjusted according to a measurement result reported by the UE. For example, the primary base station or an OAM may preset the data transmission parameter according to the measurement result reported by the UE; or the primary base station or the OAM presets an initial data transmission parameter, and then adjusts the data transmission parameter according to the measurement result reported by the UE. Certainly, the measurement result reported by the UE may also be referred in a process of initial configuration or adjustment of the data transmission parameter. Similar to the data transmission parameter, the configuration parameter may be configured or adjusted according to the measurement result reported by the UE.

Figure 8:
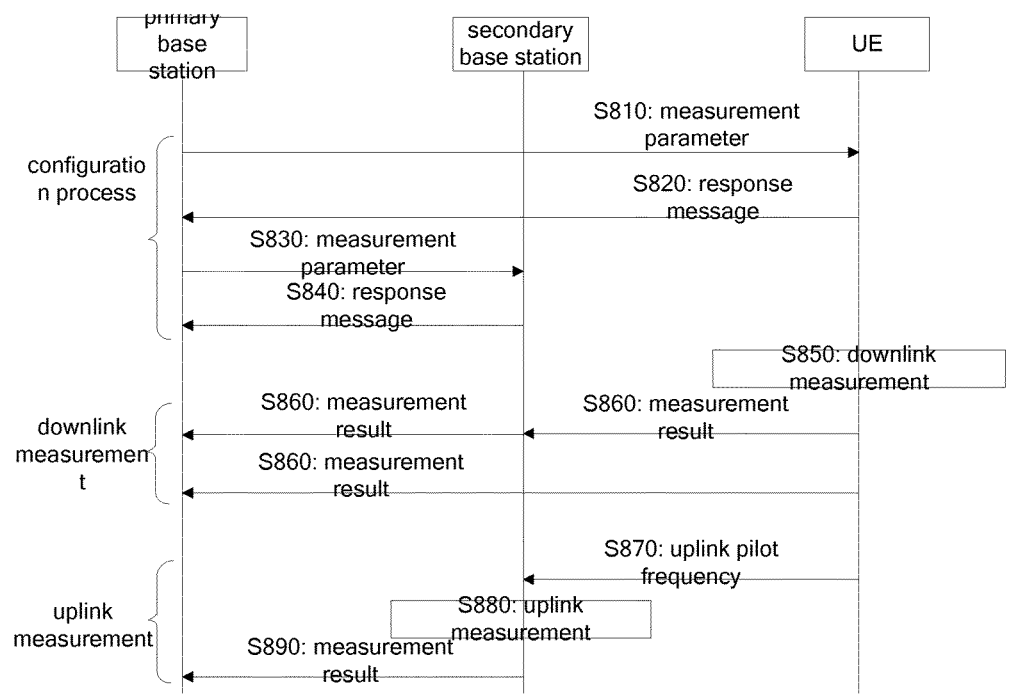
FIG. 8 is a flowchart of a data transmission method according to a seventh embodiment of the present invention.

Please refer to FIG. 8, which is a flowchart of a data transmission method according to the seventh embodiment of the present invention. As shown in FIG. 8, the method includes the following step:

S810: A primary base station sends a measurement parameter to a UE.

The measurement parameter includes a measurement parameter of a secondary base station, i.e., a parameter related to a measurement, performed by the UE, of quality of a link between the UE and the secondary base station. Certainly, the primary base station may also configure a measurement parameter of the primary base station, i.e., the measurement parameter may also include a measurement parameter of the primary base station. Hereinafter, the configuration of the measurement parameter of the secondary base station is taken as an example, and the configuration of the measurement parameter of the primary base station is similar, and details are not described herein again.

The primary base station may send the measurement parameter to the UE by using an RRC message (for example, an RRC reconfiguration message), an MAC layer message (for example, an MAC CE) or a PHY layer message. Certainly, the measurement parameter may be sent in other manners. The manners used by the primary base station to send the measurement parameter to the UE are not limited in the present invention.

For a downlink measurement, the measurement parameter may include a measurement signal and a reporting parameter. The measurement signal may include one or more of the following signals:

a channel state information reference signal (channel state information reference signal, CSI-RS), a discovery signal (discovery signal) or a discovery reference signal (discovery reference signal, DRS), and a cell-specific reference signal (cell-specific reference signal, CRS).

The reporting parameter specifies a mechanism used by the UE to report a measurement result corresponding to the measurement signal to the secondary base station, the reporting parameter includes a reporting manner and/or a reporting resource. The reporting manner may include a condition for triggering a measurement reporting, for example, the reporting is triggered by an even or is performed periodically.

The reporting resource may be an uplink resource used by the UE to report the measurement result to the secondary base station or may be an uplink resource used by the UE to report the measurement result to the primary base station, this is because that the UE may report the measurement result to the primary base station thourgh the secondary base station or may directly report the measurement result to the primary base station.

For an uplink measurement, the measurement parameter may further include a parameter for sending an uplink pilot (for example, a sounding reference signal (sounding reference signal, SRS)) by the UE, which is used by the secondary base station to measure an uplink channel of the UE. The parameter for sending the uplink pilot by the UE may include a sending period of the uplink pilot and a sending resource of the uplink pilot.

After receiving the measurement parameter, the UE may send a response message to the primary base station to notify the primary base station that the measurement parameter has been received. Certainly, the response message may not be sent to the primary base station, and the primary base station believes that the measurement parameter has been received successfully by default.

That is to say, when the UE sends the response message to the primary base station, the method shown in FIG. 8 further includes:

S820: The UE sends the response message to the primary base station.

The response message may be sent by using an RRC message, an MAC layer message or a PHY layer message.

In addition, the primary base station may also configure, for the secondary base station, the measurement parameter configured for the UE in step S810, so that the secondary base station knows information such as the UE is to perform a downlink measurement and signaling to be measured. Therefore, for the downlink measurement, the secondary base station sends a configuration measurement signal to the UE according to the configuration of the primary base station, for the UE to perform the downlink measurement. For the uplink measurement, the secondary base station knows an uplink measurement signal sent by the UE and accordingly performs the uplink measurement on the UE. Certainly, the measurement parameter may not be configured for the secondary base station, which is not limited in the present invention.

When the measurement parameter is sent to and configured for the secondary base station, the method shown in FIG. 8 further includes:

S830: The primary base station sends the measurement parameter to the secondary base station.

The primary base station may send the measurement parameter to the secondary base station by using an X2 interface message. However, the present invention is not limited thereto, the measurement parameter may be sent to the secondary base station by using other wire transmission manners or through an air interface. In a word, the manner used by the primary base station to send the measurement parameter to the secondary base station is not limited in the present invention.

Accordingly, after receiving the measurement parameter, the secondary base station may send a response message to the primary base station to notify the primary base station that the measurement parameter has been received. Certainly, the response message may not be sent to the primary base station, and the primary base station believes that the measurement parameter has been received successfully.

That is to say, when the response message is sent to the primary base station, the method shown in FIG. 8 further includes:

step S840: The secondary base station sends the response message to the primary base station.

It should be noted that, no limitation is set for an order of sending the measurement parameter to the UE and to the secondary base station by the primary base station, i.e., the measurement parameter may be sent to the UE firstly, or may be sent to the secondary base station firstly, or may be sent to the UE and the secondary base station simultaneously, which is not limited in the present invention.

The following describes a process of measuring and reporting after configuration of the measurement parameter is completed.

For a downlink channel measurement of the secondary base station, the UE performs a measurement on a downlink channel of the secondary base station according to the measurement parameter configured by the primary base station, and reports a measurement result. That is to way, the method shown in FIG. 8 further includes:

S850: The UE performs measurement on the downlink channel of the secondary base station according to the measurement parameter; and S860: The UE reports the measurement result.

The UE may autonomously report the measurement result by using a pre-configured resource. Or the primary base station may configure a reporting resource for the UE by using the measurement parameter, and accordingly, the UE reports the measurement result by using the reporting resource configured by the primary base station.

Optionally, in addition to reporting the measurement result for the secondary base station to the secondary base station, the UE may also report the measurement result for the downlink channel of the secondary base station to the primary base station, and the primary base station refers the measurement result to change the measurement parameter configured in the embodiment or adjust the data transmission parameter in the above embodiments.

Optionally, when the measurement parameter of the primary base station is configured for the UE, the UE may also report a measurement result for a downlink channel of the primary base station to the primary base station or to the secondary base station according to the configured parameter.

Optionally, another manner for reporting the measurement result for the downlink channel of the secondary base station to the primary base station is that, the UE firstly reports the measurement result to the secondary base station, then the secondary base station sends, to the primary base station, the measurement result or a result of an uplink measurement performed on the UE by the secondary base station, so that the primary base station refers the measurement result to change the measurement parameter configured in the embodiment or adjusts the data transmission parameter in the above embodiments.

For an uplink channel measurement of the secondary base station, the UE sends an uplink pilot (for example an SRS) to the secondary base station, the secondary base station performs an uplink measurement according to the uplink pilot, and then reports a measurement result to the primary base station. That is to say, the method shown in FIG. 8 further includes:

S870: The UE sends the uplink pilot to the secondary base station.

The primary base station may configure a parameter of the uplink pilot, such as a sending period of the uplink pilot and a sending resource of the uplink pilot, for the UE by using the measurement parameter. Therefore, the UE sends the uplink pilot to the secondary base station according to the configuration of the primary base station.

Optionally, the primary base station may configure, for the UE by using the measurement parameter, the parameter of sending the uplink pilot to the primary base station, for example, a sending period of the uplink pilot and a sending resource of the uplink pilot. Therefore, the UE sends the uplink pilot to the primary base station according to the configuration of the primary base station.

S880: The secondary base station performs an uplink channel measurement according to the uplink pilot sent by the UE.

S890: The secondary base station sends a measurement result to the primary base station.

Therefore, the primary base station may adjust the measurement parameter according to an uplink measurement result reported by the secondary base station and a downlink measurement result reported by the secondary base station or the UE, and may adjust or configure the data transmission parameter or the configuration parameter in the above embodiments according to these measurement results.

For example, when the primary base station finds, according to the measurement result sent by the UE or the secondary base station, that an signal strength becomes worse or an interference becomes stronger, the primary base station may appropriately reduce the originally configured data block size, or decrease the MCS of data transmission, or allocate more resources, or even cancel the data transmission of data performed through the secondary base station. When the primary base station finds, according to the measurement result sent by the UE or the secondary base station, that an signal strength becomes better or an interference becomes less, the primary base station may appropriately increase the originally configured data block size or improve the MCS of data transmission.

It should be noted that, more embodiments may be obtained by combining the seventh embodiment with one or more of the second to the sixth embodiments. In addition, when the measurement parameter is used for configuring the data transmission parameter, the configuration of the measurement parameter and the uplink and downlink measurements may be performed before the configuration of the data transmission parameter. When the above measurement parameter is used for adjusting the data transmission parameter, no limitation is set for an order of the configuration of the measurement parameter and the configuration of the data transmission parameter, and the two configurations may be performed simultaneously; and no limitation is set for an order of the uplink and downlink measurements and the uplink and downlink data transmissions. The configuration parameter is processed similarly, and details are not described herein again.

In the above embodiments, the data transmission parameter of the secondary base station is configured by the primary base station, and the protocol design of the secondary base station is simplified. That is, the secondary base station merely reserves simple buffering, encapsulating, and transceiving functions, or even merely has the buffering and transceiving functions, so that cost of the micro base station is reduced and a deployment is facilitated.

In addition, under a scene of inter-base station CA, a link between base stations may be an ideal link or a non-ideal link. For the so-called ideal link, a transmission delay and a packet loss of the link are usually not to be taken into consideration. In this case, for the UE, the inter-base station CA does not differ from intra-base station CA, and uplink and downlink data transmission may be performed by using an existing intra-base station technology. For the so-called non-ideal link, the transmission delay or the packet loss can not be ignored, which generates a certain influence on the uplink and downlink data transmission. For example, under a scene of intra-base station CA, the UE feeds back, by using a primary carrier PUCCH, a reception condition of downlink data of a primary carrier and a secondary carrier, and then the primary carrier and the secondary carrier perform an HARQ retransmission according to the feedback. And under a scene of inter-base station CA, if the UE still sends a feedback at the primary base station, the secondary base station can not receive the feedback sent by the UE timely due to the transmission delay of the non-ideal link between base stations, and accordingly, the HARQ retransmission cannot be performed timely. In the sixth embodiment, the UE may feed back, to the secondary base station, a reception condition of the downlink according to the configuration of the primary base station, thereby solving the problem that the secondary base station can not receive the feedback sent by the UE timely and the HARQ retransmission can not be performed timely.

In addition, the transmission delay or the packet loss also generates a certain influence on a data forwarding during a moving process. For example in the downlink data transmission, since the link between base stations is non-ideal, it is difficult to determine when to send data from the primary base station and how much data to be sent to the secondary base station for transmission. A large amount of data may need to be forwarded after the UE moves if the primary base station sends more data, and a maximum effectiveness is not realized if the primary base station sends less data. The so-called data forwarding refers to that, when the UE moves and an accessed secondary base station changes, a data packet, which is sent by the primary base station to a secondary base station before the changing but is not sent to the UE, needs to be transmitted back to the primary base station or transmitted to a secondary base station after the changing. In the above embodiments, since the design of the secondary base station is simplified (for example, only has basic functions of the MAC layer and the PHY layer) and the data transmission parameter is controlled by the primary base station, a data shaping may be performed well, thereby avoiding unnecessary data forwarding in the case that the secondary base station for the UE changes.

To further improve the data transmission between the primary base station and the secondary base station and to reduce unnecessary data forwarding, several optional transmission controlling mechanisms are provided in the eighth embodiment of the present invention, which are detailed as follows.

A first mechanism: the secondary base station is configured to perform HARQ transmission once, and the secondary base station does not perform any other HARQ retransmission no matter whether the UE receives data correctly or not.

Optionally, the primary base station may perform the configuration for the secondary base station. For example, the configuration is performed by using the data transmission parameter in the above embodiments, i.e., the data transmission parameter includes a maximum quantity of transmission times, and the maximum quantity of transmission times is one. The configuration for the secondary base station may alternatively be performed in a preset way, i.e., the secondary base station is preset to perform HARQ transmission once.

Correspondingly, the UE may not perform an HARQ feedback.

Optionally, for an uplink process, the UE may be configured to perform HARQ transmission once, i.e., the UE does not perform any HARQ retransmission for data no matter whether the secondary base station receives the data correctly or not. Correspondingly, the secondary base station may not perform an HARQ feedback.

In this case, a situation that a large amount of downlink data is buffered at the secondary base station or a large amount of uplink data is buffered at the UE due to a mismatching between a sending speed of the secondary base station and that of the primary base station may be avoided. When data is not transmitted successfully through the secondary base station, since the RLC entity is located at the primary base station, a retransmission is performed at the primary base station in case of an acknowledged mode RLC, and the primary base station may initiate an ARQ retransmission. A further retransmission may be performed by the primary base station or the secondary base station, which is not limited herein. The data packet is not retransmitted by the primary base station in case of an unacknowledged mode RLC.

A second mechanism: a transmission time interval bundling (transmission time interval bundling, TTI bundling) is configured for the secondary base station, i.e., a data packet is continuously transmitted multiple times according to a configuration, and no HARQ retransmission is performed no matter whether the data is transmitted correctly.

Compared with the first mechanism, reliability of data transmission may be improved with the second mechanism.

A third mechanism: the primary base station sends data to the secondary base station based on maximum transmission time intervals (transmission time intervals, TTIs). The maximum TTIs refer to TTIs that are required when the primary base station assumes that the secondary base station sends each data packet at a maximum quantity of retransmission times or a maximum quantity of transmission times to complete the sending of the data packet.

For example, it is assumed that the maximum quantity of transmission times configured for the secondary base station by the primary base station is 4, and the secondary base station generally has 8 HARQ processes. When the primary base station continuously sends 8 packets to the secondary base station, only after the first packet is transmitted for the maximum quantity of transmission times of 4, i.e., the first packet is transmitted at a moment N, retransmitted at a moment N+8, retransmitted again at a moment N+16, retransmitted again at a moment N+24, a ninth packet may be transmitted at a moment N+32. In the long term, the primary base station may send 8 packets to the secondary base station every 32 TTIs on average.

In this case, the secondary base station may sufficiently complete the data transmission, and the reliability of the data transmission is improved; on the other hand, a speed of sending data from the primary base station to the secondary base station may be matched well with a speed of sending data from the secondary base station, thereby alleviating a problem of data forwarding resulted from a large number of data packets buffered at the secondary base station or a low transmission efficiency due to a low speed of sending data from the primary base station.

A fourth mechanism: a feedback mechanism is designed between the primary base station and the secondary base station. Specifically, the secondary base station may feed back its data transmission status to the primary base station, to assist the primary base station to adjust the data transmission. For example, the primary base station may be assisted to adjust the data transmission parameter in the above embodiments or the data transmission controlling mechanism.

The manner for feeding back the data transmission status from the secondary base station to the primary base station may be a periodic feedback or an event-triggered feedback. A feedback period may be configured by the primary base station for the secondary base station, for example, the feedback period is sent to the secondary base station by using the data transmission parameter. Certainly, the feedback period may be sent to the secondary base station independently, or may be preset in the secondary base station and implemented by the secondary base station, or may be determined after a negotiation performed by the primary base station and the secondary base station, which is not limited in the present invention. For the event-triggered feedback, the secondary base station is triggered by a certain event at the secondary base station side to feed back status information. For example, the data transmission status is fed back to the primary base station when an amount of data buffered in the secondary base station reaches or exceeds a certain threshold. For another example, an amount of data buffered in the secondary base station reaches or exceeds a certain threshold and maintains reaching or exceeding the certain threshold for a period of time. Specifically, the threshold may be a quantity of buffered data packets or a total size of buffered data packets. In addition, the threshold or the maintained time may be configured for the secondary base station by the primary base station, for example, may be sent to the secondary base station by using the data transmission parameter, or certainly, the threshold or the maintained time may be sent to the secondary base station independently; or, the threshold or the maintained time may be preset in the secondary base station and is implemented by the secondary base station; or, the threshold or the maintained time may be determined after a negotiation performed by the primary base station and the secondary base station; which is not limited in the present invention. For another example, the data transmission status is fed back to the primary base station when the amount of the buffered data is below a certain threshold. For another example, the amount of the data buffered in the secondary base station is below a certain threshold and maintains below the certain threshold for a period of time. Specifically, the threshold may be a quantity of buffered data packets or a total size of buffered data packets. In addition, the threshold or the maintained time may be configured for the secondary base station by the primary base station, for example, may be sent to the secondary base station by using the data transmission parameter, or certainly, the threshold or the maintained time may be sent to the secondary base station independently; or, the threshold or the maintained time may be preset in the secondary base station and is implemented by the secondary base station; or, the threshold and the maintained time may be determined after a negotiation performed by the primary base station and the secondary base station; which is not limited in the present invention.

Feedback information, that is, the data transmission status, may be indication information used to indicate information that an amount of the buffered data exceeds a threshold or an amount of the buffered data exceeds a threshold and maintains exceeding the threshold for a period of time; or to indicate information about a part that is of an amount of the buffered data and that exceeds a threshold; or to indicate specific information about an amount of the buffered data. Alternatively, the feedback information may be indication information used to indicate information that an amount of the buffered data is below a threshold or an amount of the buffered data is below a threshold and maintains below the threshold for a period of time; or to indicate information about a part that is of an amount of the buffered data and that is below a threshold.

Accordingly, when the amount of the data buffered in the secondary base station exceeds a threshold and maintains exceeding the threshold for a period of time, the secondary base station may notify the primary base station, the primary base station may adjust a strategy for the data transmission and may reduce the amount of data sent to the secondary base station or suspend sending data to the secondary base station, thereby alleviating the problem of forwarding a large amount of data. Alternatively, when the amount of data buffered in the secondary base station is below a threshold and maintains below the threshold for a period of time, the secondary base station may notify the primary base station, the primary base station may adjust the strategy for the data transmission and may increase the amount of data sent to the secondary base station, thereby alleviating the problem of forwarding a large amount of data.

A fifth mechanism: a feedback mechanism for the UE is designed.

For example, for the downlink data transmission, the UE feeds back acknowledgement information, such as acknowledgement (ACK) or negative acknowledgement (NACK), to the primary base station and the secondary base station simultaneously; the secondary base station performs an HARQ retransmission according to the configuration of the primary base station; and after receiving the feedback from the UE, the primary base station determines, according to the feedback, a frequency of subsequently sending data packets to the secondary base station. For example, if all acknowledgement information received by the primary base station is ACK, the UE successfully receives data sent by the secondary base station; or if the primary base station receives NACK, the secondary base station needs to retransmit data sent to the UE and the primary base station may need to decrease a speed of sending data to the secondary base station.

For another example, for the downlink data transmission, the UE feeds back acknowledgement information (ACK or NACK) to the primary base station, and the primary base station performs an HARQ retransmission. After receiving the downlink data from the secondary base station, the UE feeds back the acknowledgement information to the primary base station, and the secondary base station is not responsible for the retransmission of the data packet. Specifically, after receiving the acknowledgement information fed back by the UE, the primary base station determines whether to retransmit the downlink data packet, and the retransmission of the data packet is performed by the primary base station.

Optionally, while sending a data packet to the secondary base station, the primary base station buffers the same data packet at the primary base station for a subsequent retransmission performed by the primary base station.

Optionally, the primary base station knows when the secondary base station sends the downlink data to the UE, so after receiving the feedback from the UE, the primary base station knows which piece of data the feedback is for and which data packet needs to be retransmitted. The primary base station discards the buffered data packet when receiving ACK, and the primary base station retransmits the data packet when receiving NACK.

For example, for the downlink data transmission, the UE feeds back acknowledgement information (ACK or NACK) to the primary base station, the primary base station performs an ARQ retransmission (for an AM data transmission mode) by using a local negative acknowledgement (Local-Nack, that is, an MAC of the primary base station receives the feedback from the UE and reports the feedback to one or more corresponding RLC entities). Different from the foregoing HARQ retransmission performed by the primary base station, when sending a data packet to the secondary base station, the primary base station does not buffer the same data packet. The primary base station receives the acknowledgement information fed back by the UE and feeds back, to one or more corresponding RLC entities, a reception condition of the data. The RLC entity of the primary base station is triggered to perform an ARQ when the acknowledgement information is NACK.

Figure 9:
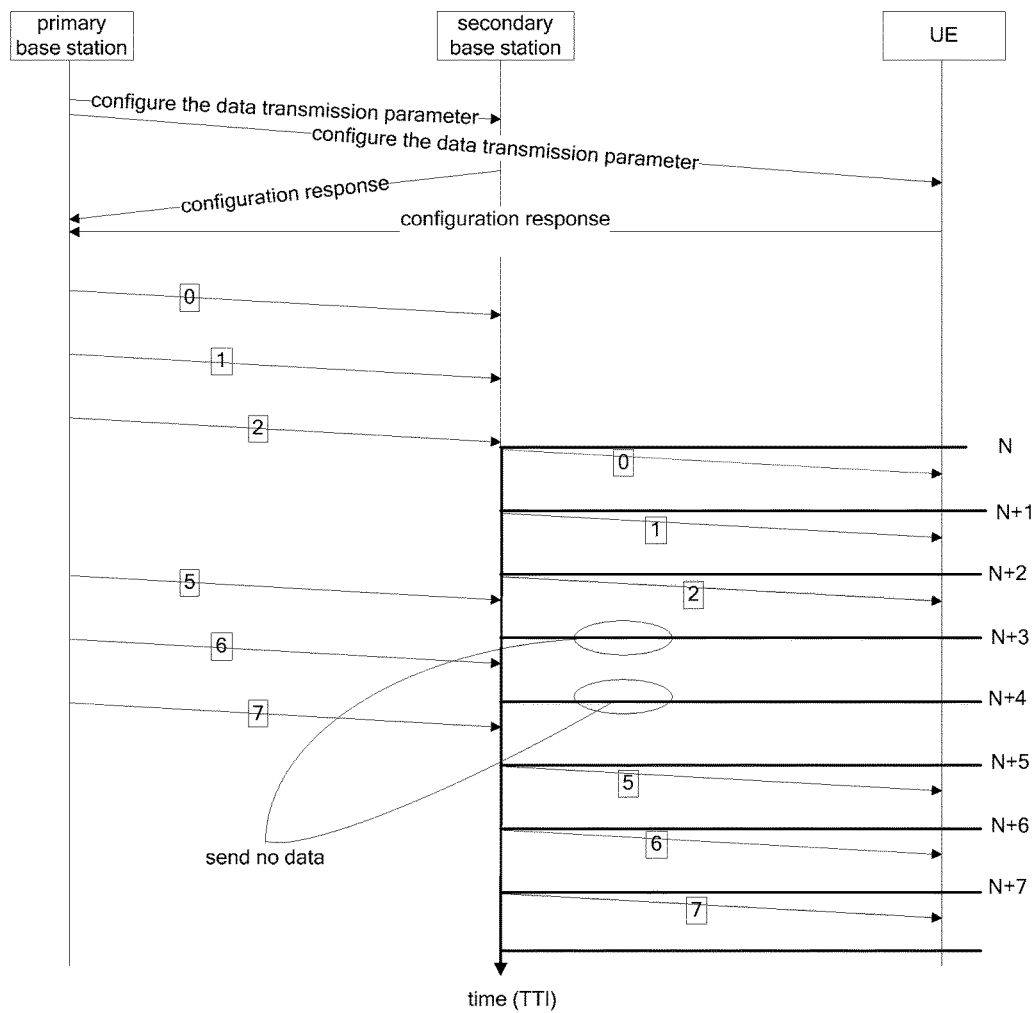
FIG. 9 is a schematic diagram of a feedback mechanism according to an eighth embodiment of the present invention.

For the manner in which the UE feeds back to the primary base station and the primary base station performs the HARQ or ARQ retransmission, the primary base station may determine which piece of data is sent by the secondary base station at a certain moment with the following method:

determining a correspondence between a sending moment and data to be sent according to a serial number of a packet head of a GTP between the primary base station and the secondary base station. As shown in FIG. 9, basic configuration information is that:

the primary base station configures that the secondary base station sends downlink data to the UE in each TTI; certainly, other periods of sending data may be configured.

The primary base station configures that the secondary base station starts to send the downlink data to the UE in TTI N (N is an integer greater than or equal to 0).

After configuring a related parameter, the primary base station generally sends data to the UE in advance since there is a transmission delay between the primary base station and the secondary base station. For example, when the secondary base station is configured to start to send data to the UE in TTI N, the primary base station sends downlink data to the secondary base station before TTI N. A data packet sent by the primary base station to the secondary base station carries information of a sequence number of the packet, for example 0, 1, 2, 3, etc. First, the sequence number represents an order in which the secondary base station sends data to the UE. For example, the secondary base station needs to send a data packet with a sequence number 0, and then sends data packets with sequence numbers 1, 2, 3, etc. It should be noted that, when the primary base station has no data to send to the secondary base station at a certain moment, a sequence number of data subsequently sent to the secondary base station and a sequence number of previously sent data are not consecutive, to indicate that the secondary base station should not send data in the certain TTI, so that the primary base station knows which data packet is sent by the secondary base station at a certain moment. In FIG. 9, in the case that the sequence numbers of the packets sent by the primary base station changes from 2 directly to 5, the secondary base station should not send any data packet in corresponding TTI (N+3) and TTI (N+4), and the secondary base station sends a data packet with a sequence number 5 at TTI (N+5).

Figure 10:
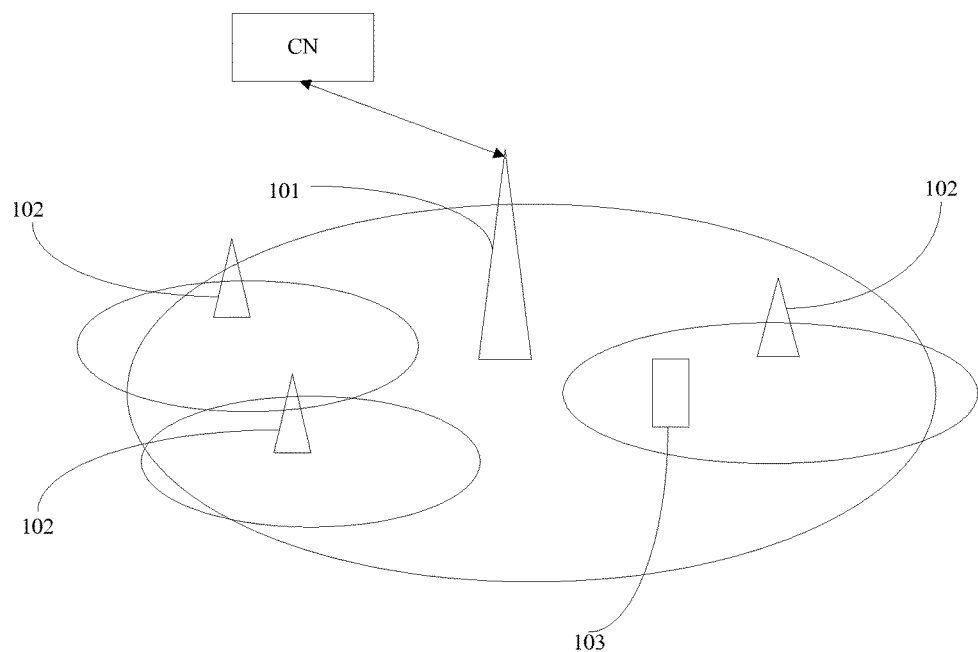
FIG. 10 is a schematic structural diagram of a communication system according to a ninth embodiment of the present invention.

For another example, for the downlink data transmission, the UE feeds back ACK or NACK to the primary base station and the secondary base station simultaneously when a joint scheduling is performed, and both the primary base station and the secondary base station retransmit data to the UE according to a pre-configured retransmission parameter. Please refer to FIG. 10, which is a schematic structural diagram of a communications system according to a ninth embodiment of the present invention. As shown in the figure, the communications system includes a primary base station 101, a secondary base station 102 and a UE 103. In the embodiment, the primary base station 101 is a macro base station which provides coverage and mobility management for the UE 103. The secondary base station 102 is a micro base station which provides data transmission for the UE 103. Generally, a link exists between the primary base station and a core network (core network, CN). Uplink data and downlink data of the UE are transmitted directly through the primary base station or transmitted firstly through the secondary base station and then through the primary base station.

Possible structures of the primary base station, the secondary base station and the UE are described in the following embodiments.

Figure 11:
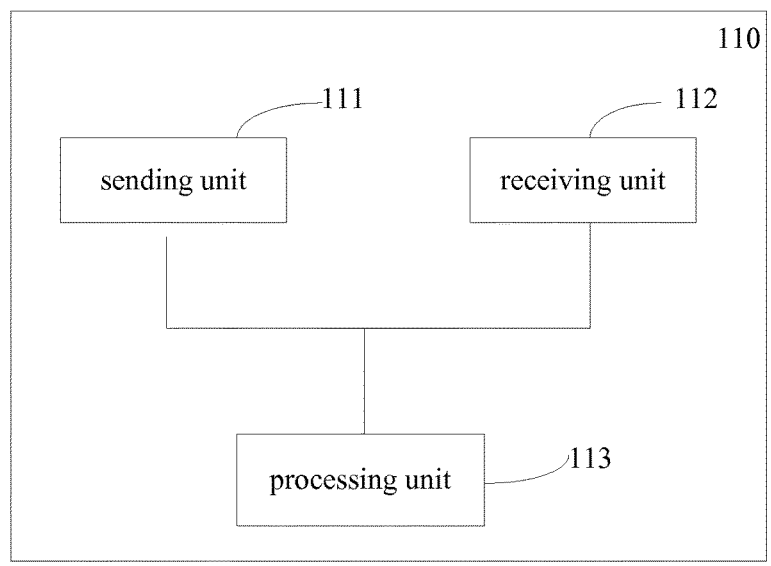
FIG. 11 is a schematic structural diagram of a primary base station according to a tenth embodiment of the present invention.

Please refer to FIG. 11, which is a schematic structural diagram of a base station according to a tenth embodiment of the present invention. As shown in the figure, the base station 110 serves as a primary base station of inter-base station CA and includes a sending unit 111, a receiving unit 112 and a processing unit 113. The sending unit 111 is configured to send a data transmission parameter to a secondary base station. The processing unit 113 is configured to send, according to the data transmission parameter in a downlink data transmission process, downlink data to the secondary base station through the sending unit 111, so as to send the downlink data to user equipment through the secondary base station. Alternatively, the processing unit 113 is configured to receive, through the receiving unit 112 in an uplink data transmission process, uplink data that is received by the secondary base station according to the data transmission parameter.

The base station is configured to perform the method on the primary base station side described in any one of the first embodiment to the eighth embodiment to achieve the effect described in the above embodiments, and details are not described herein again.

In addition, the composition of the data transmission parameter may be any composition described in any one or any combination of the first embodiment to the eighth embodiment, and details are not described herein again.

Optionally, the sending unit 111 is further configured to send a configuration parameter to the UE, so that the UE feeds back a reception condition of downlink data or retransmits uplink data according to the configuration parameter. For the composition of the configuration parameter, reference may be made to the sixth embodiment, and details are not described herein again.

Optionally, the processing unit 113 is further configured to send, in the downlink data transmission process, the downlink data to the secondary base station based on maximum TTIs and through the sending unit 111. The maximum TTIs refer to TTIs that are required when the primary base station assumes that the secondary base station sends each data packet at a maximum quantity of retransmission times or a maximum quantity of transmission times to complete the sending of the data packet. Specifically, reference may be made to the eighth embodiment, and details are not described herein again.

Optionally, when an amount of data buffered in the secondary base station exceeds a threshold and maintains exceeding the threshold for a period of time, the processing unit 113 is further configured to receive, through the receiving unit 112, status information that is of data transmission and sent by the secondary base station. The processing unit 113 is further configured to adjust downlink data transmission according to the status information. Specifically, reference may be made to the eighth embodiment, and details are not described herein again.

Optionally, in the downlink data transmission process, the processing unit 113 is further configured to receive, through the receiving unit 112, acknowledgement information fed back by the UE; the acknowledgement information is also fed back to the secondary base station, and the secondary base station performs an HARQ retransmission. The processing unit 113 is further configured to reduce, when the acknowledgement information is NACK, a speed of sending downlink data to the secondary base station. Specifically, reference may be made to the eighth embodiment, and details are not described herein again.

Optionally, in the downlink data transmission process, the processing unit 113 is further configured to receive, through the receiving unit 112, acknowledgement information fed back by the UE. The processing unit 113 is further configured to perform, when the acknowledgement information is NACK, an HARQ retransmission. Specifically, reference may be made to the eighth embodiment, and details are not described herein again.

Optionally, the sending unit 111 is further configured to send a measurement parameter of the secondary base station to the UE; the receiving unit 112 is further configured to receive a measurement result reported by the UE directly or reported by the UE through the secondary base station, where the measurement result is obtained after the UE performs measurement according to the measurement parameter; and the processing unit 113 is further configured to configure or adjust the data transmission parameter according to the measurement result. Specifically, reference may be made to the seventh embodiment, and details are not described herein again.

It should be noted that, when the data transmission parameter includes a data packet size, the processing unit 113 is specifically configured to generate, in the downlink data transmission process, a downlink data packet according to the data packet size; and send, in the downlink data transmission process and through the sending unit 111, the downlink data packet to the secondary base station, so as to send the downlink data packet to the UE through the secondary base station.

In this case, the secondary base station merely needs to implement an MAC layer protocol and a PHY layer protocol and does not need to implement a PDCP layer protocol and an RLC layer protocol, thereby simplifying a protocol stack of the secondary base station and reducing the cost of the secondary base station.

Figure 12:
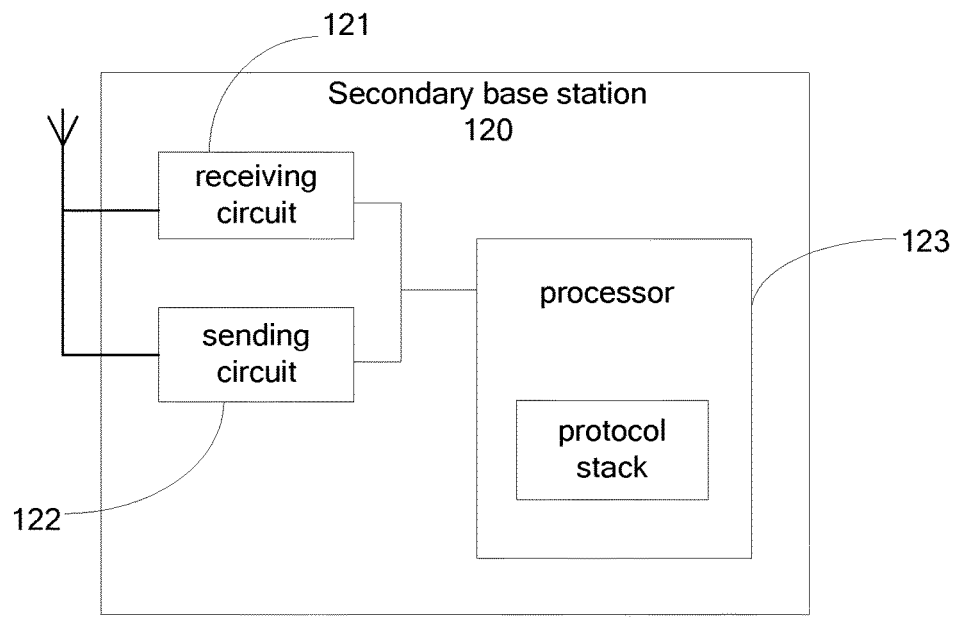
FIG. 12 is a schematic structural diagram of a secondary base station according to an eleventh embodiment of the present invention.

Correspondingly, a secondary base station is provided according to an eleventh embodiment of the present invention. As shown in FIG. 12, the secondary base station 120 includes a receiving circuit 121, a sending circuit 122 and a processor 123 connected to both the receiving circuit 121 and the sending circuit 122. The receiving circuit 121 is configured to receive data, the sending circuit 122 is configured to send data, and the processor 123 is configured to process data. The processor 123 controls data reception of the receiving circuit 121 and data sending of the sending circuit 122 according to a protocol stack, and the protocol stack includes an MAC layer protocol and a PHY layer protocol but does not include a PDCP and/or an RLC layer protocol, or the protocol stack includes an MAC layer protocol, a PHY layer protocol and a simplified RLC function such as a buffering function.

In addition, a protocol stack in a secondary base station is provided according to the embodiment. The protocol stack includes an MAC layer protocol and a PHY layer protocol but does not include a PDCP and/or an RLC layer protocol, or the protocol stack includes an MAC layer protocol, a PHY layer protocol and a simplified RLC function such as a buffering function.

Figure 13:
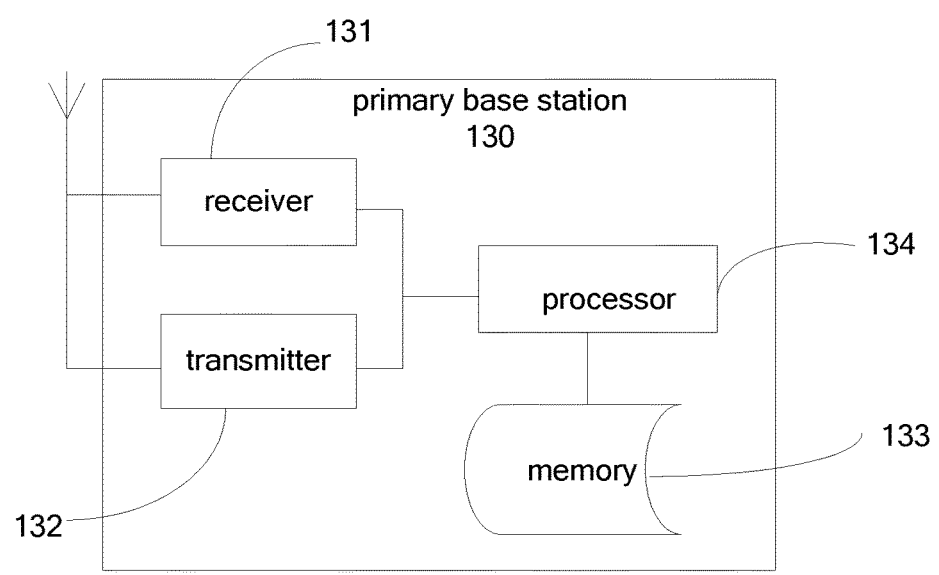
FIG. 13 is a schematic structural diagram of a primary base station according to an twelfth embodiment of the present invention.

Please refer to FIG. 13, which is a schematic structural diagram of a base station according to a twelfth embodiment of the present invention. As shown in the figure, the base station 130 serves as a primary base station of inter-base station CA and includes a receiver 131, a transmitter 132, a memory 133 and a processor 134 connected to the receiver 131, the transmitter 132 and the memory 133. Certainly, the base station may further include general-purpose components such as an antenna, a baseband processing component, an intermediate radio frequency processing component and an input and output device, which is not limited in the embodiment of the present invention.

The memory 133 stores a set of program code. The processor 134 is configured to invoke the program code stored in the memory 133 to perform the method on the primary base station side described in any one of the first embodiment to the eighth embodiment to achieve the effect described in the above embodiments, and details are not described herein again.

For example, the following operations are performed:
sending, through the transmitter 132, a data transmission parameter to a secondary base station;

sending, according to the data transmission parameter in a downlink data transmission process, downlink data to the secondary base station through the transmitter 132, so as to send the downlink data to UE through the secondary base station; or receiving, through the receiver 131 in an uplink data transmission process, uplink data that is received by the secondary base station according to the data transmission parameter.

Figure 14:
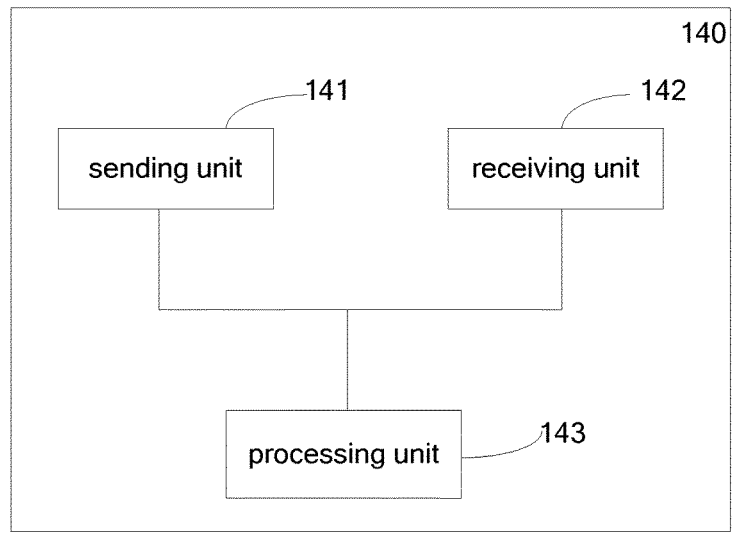
FIG. 14 is a schematic structural diagram of a secondary base station according to a thirteenth embodiment of the present invention.

Please refer to FIG. 14, which is a schematic structural diagram of a base station according to a thirteenth embodiment of the present invention. As shown in the figure, the base station 140 serves as a secondary base station of inter-base station CA and includes a sending unit 141, a receiving unit 142 and a processing unit 143. The receiving unit 142 is configured to receive a data transmission parameter sent by a primary base station. The processing unit 143 is configured to receive, in a downlink data transmission process and through the receiving unit 142, downlink data that is sent by the primary base station according to the data transmission parameter; and send, in the downlink data transmission process and through the sending unit 141, the downlink data to UE. Or the processing unit 143 is configured to receive, in an uplink data transmission process and through the receiving unit 142, uplink data according to the data transmission parameter; and send, in the uplink data transmission process and through the sending unit 141, the uplink data to the primary base station.

The base station is configured to perform the method on the secondary base station side described in any one of the first embodiment to the eighth embodiment to achieve the effect described in the above embodiments, and details are not described herein again.

In addition, the composition of the data transmission parameter may be any composition described in any one or any combination of the first embodiment to the eighth embodiment.

For example, when the data transmission parameter includes a data packet size, the downlink data which is sent by the primary base station according to the data transmission parameter and received by the receiving unit 142 is a downlink data packet generated by the primary base station according to the data packet size. In this case, the secondary base station merely needs to implement an MAC layer protocol and a PHY layer protocol and does not need to implement a PDCP layer protocol and an RLC layer protocol, thereby simplifying a protocol stack of the secondary base station and reducing the cost of the secondary base station.

Further for example, when the data transmission parameter includes a MCS, in the downlink data transmission process, the processing unit 143 is specifically configured to send, through the sending unit 141, the downlink data to the UE according to the MCS; and in the uplink data transmission process, the processing unit 143 is specifically configured to send, through the sending unit 141, the uplink data to the primary base station according to the MCS.

Further for example, when the data transmission parameter includes resource information, in the downlink data transmission process, the processing unit 143 is specifically configured to send, through the sending unit 141, the downlink data to the UE on a downlink resource determined by the resource information; and in the uplink data transmission process, the processing unit 143 is specifically configured to schedule an uplink resource determined by the resource information and receive, through the receiving unit 142, the uplink data on the determined uplink resource.

Further for example, when the data transmission parameter includes a maximum quantity of transmission times or a maximum quantity of retransmission times, in the downlink data transmission process, the processing unit 143 is further configured to discard a data packet of which a quantity of transmission times reaches the maximum quantity of transmission times or a data packet of which a quantity of retransmission times reaches the maximum quantity of retransmission times.

Optionally, in the downlink data transmission process, the processing unit 143 is further configured to receive, through the receiving unit 142 and based on maximum TTIs, data sent by the primary base station. The maximum TTIs refer to TTIs that are required when the primary base station assumes that the secondary base station sends each data packet at a maximum quantity of retransmission times or a maximum quantity of transmission times to complete the sending of the data packet. Specifically, reference may be made to the eighth embodiment, and details are not described herein again.

Figure 15:
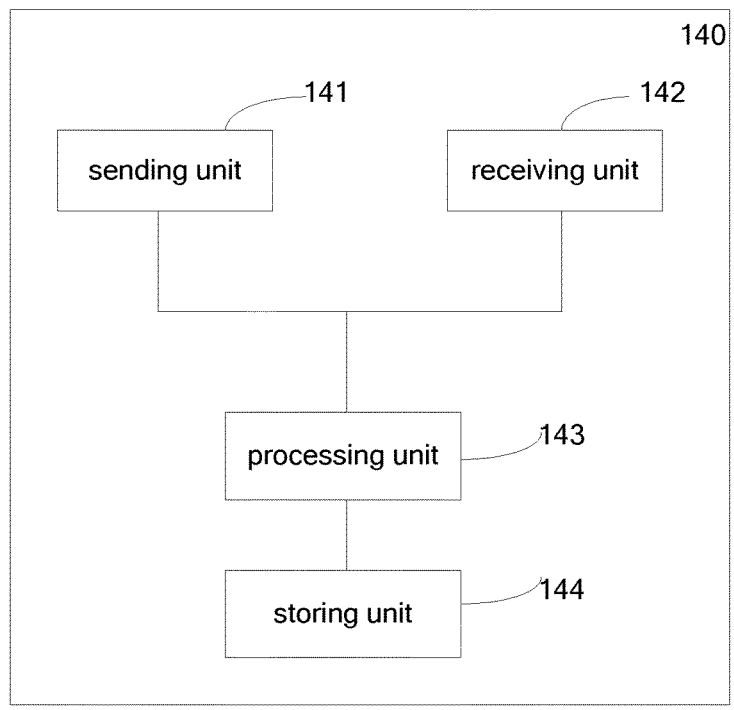
FIG. 15 is a schematic structural diagram of another secondary base station according to the thirteenth embodiment of the present invention.

Optionally, as shown in FIG. 15, the secondary base station further includes a storing unit 144 configured to buffer the downlink data sent by the primary base station to the secondary base station. When an amount of data buffered in the secondary base station exceeds a threshold and maintains exceeding the threshold for a period of time, the processing unit 143 is further configured to send, through the sending unit 141, status information of data transmission to the primary base station, so that the primary base station adjusts transmission of the downlink data according to the status information. Specifically, reference may be made to the eighth embodiment, and details are not described herein again.

Figure 16:
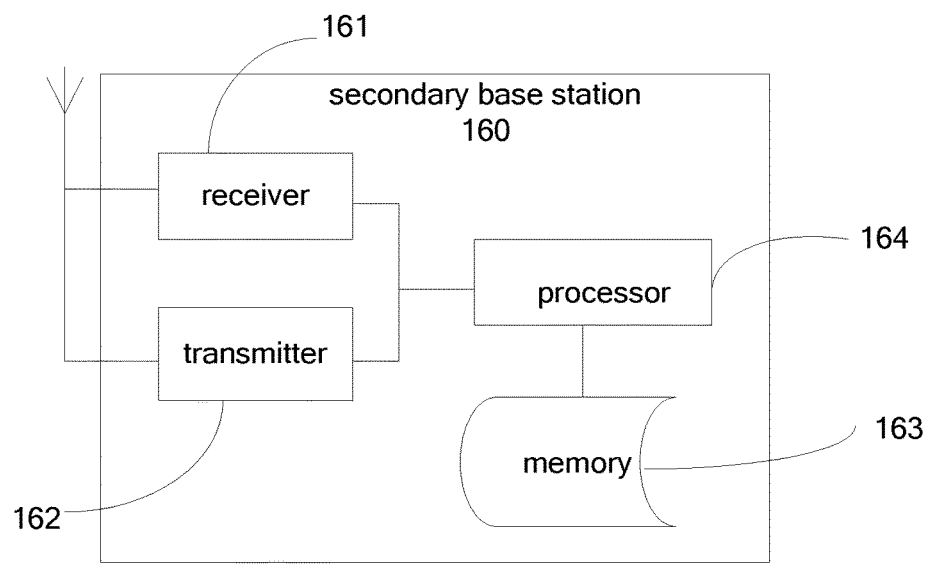
FIG. 16 is a schematic structural diagram of a secondary base station according to a fourteenth embodiment of the present invention.

Please refer to FIG. 16, which is a schematic structural diagram of a base station according to a fourteenth embodiment of the present invention. As shown in the figure, the base station 160 serves as a secondary base station of inter-base station CA and includes a receiver 161, a transmitter 162, a memory 163 and a processor 164 connected to the receiver 161, the transmitter 162 and the memory 163. Certainly, the base station may further include general-purpose components such as an antenna, a baseband processing component, an intermediate radio frequency processing component and an input and output device, which is not limited in the embodiments of the present invention.

The memory 163 stores a set of program code. The processor 164 is configured to invoke the program code stored in the memory 163 to perform the method on the secondary base station side described in any one of the first embodiment to the eighth embodiment to achieve the effect described in the above embodiments, and details are not described herein again.

For example, the following operations are performed:

receiving, through the receiver 161, a data transmission parameter sent by a primary base station;

receiving, in a downlink data transmission process and through the receiver 161, downlink data that is sent by the primary base station according to the data transmission parameter; and sending, in the downlink data transmission process and through the transmitter 162, the downlink data to UE; or receiving, in an uplink data transmission process and through the receiver 161, uplink data according to the data transmission parameter; and sending, in the uplink data transmission process and through the transmitter 162, the uplink data to the primary base station.

Figure 17:
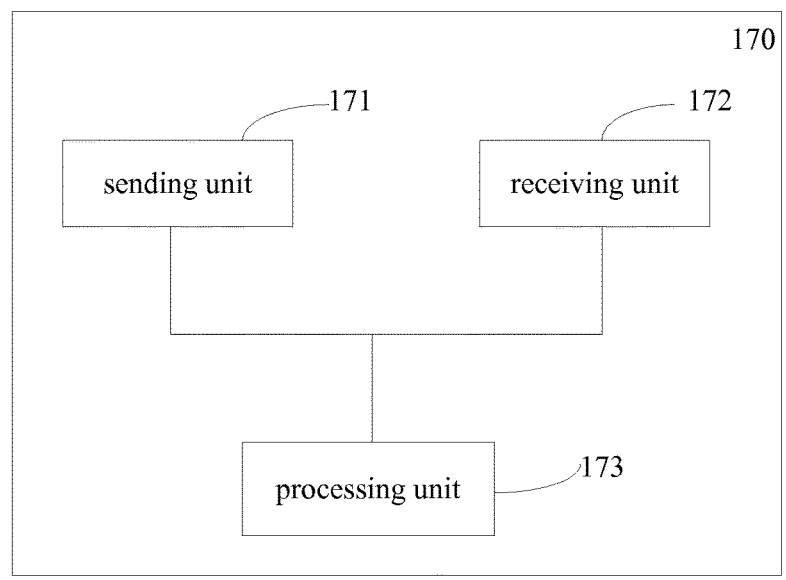
FIG. 17 is a schematic structural diagram of a UE according to a fifteenth embodiment of the present invention.

Please refer to FIG. 17, which is a schematic structural diagram of UE according to a fifteenth embodiment of the present invention. As shown in the figure, the UE 170 includes a sending unit 171, a receiving unit 172 and a processing unit 173. The receiving unit 172 is configured to receive a configuration parameter sent by a primary base station. The processing unit 173 is configured to feed back, when the receiving unit 172 receives downlink data sent by a secondary base station, a reception condition of the downlink data according to the configuration parameter and through the sending unit 171. Alternatively, the processing unit 173 is configured to retransmit, when the sending unit 171 needs to retransmit uplink data sent to a secondary base station, the uplink data according to the configuration parameter and through the sending unit 171.

The base station is configured to perform the method on the UE side described in any one of the first embodiment to the eighth embodiment to achieve the effect described in the above embodiments, and details are not described herein again.

In addition, for the composition of the configuration parameter, reference may be made to the sixth embodiment.

For example, when the data transmission parameter includes a resource parameter, the processing unit 173 is specifically configured to feed back, through the sending unit 171, the reception condition of the downlink data on a resource determined by the resource parameter. Alternatively, the processing unit 173 is specifically configured to retransmit, through the sending unit 171, the uplink data on a resource determined by the resource parameter.

Optionally, in a downlink data transmission process, the processing unit 173 is further configured to feed back, through the sending unit 171, acknowledgement information to both the primary base station and the secondary base station, so that, when the acknowledgement information is NACK, the secondary base station performs an HARQ retransmission and the primary base station reduces a speed of sending downlink data to the secondary base station. Specifically, reference may be made to the eighth embodiment, and details are not described herein again.

Optionally, in the downlink data transmission process, the processing unit 173 is further configured to feed back, through the sending unit 171, acknowledgement information to the primary base station, so that, when the acknowledgement information is NACK, the primary base station performs an HARQ retransmission. Specifically, reference is made to the eighth embodiment, and details are not described herein again.

Figure 18:
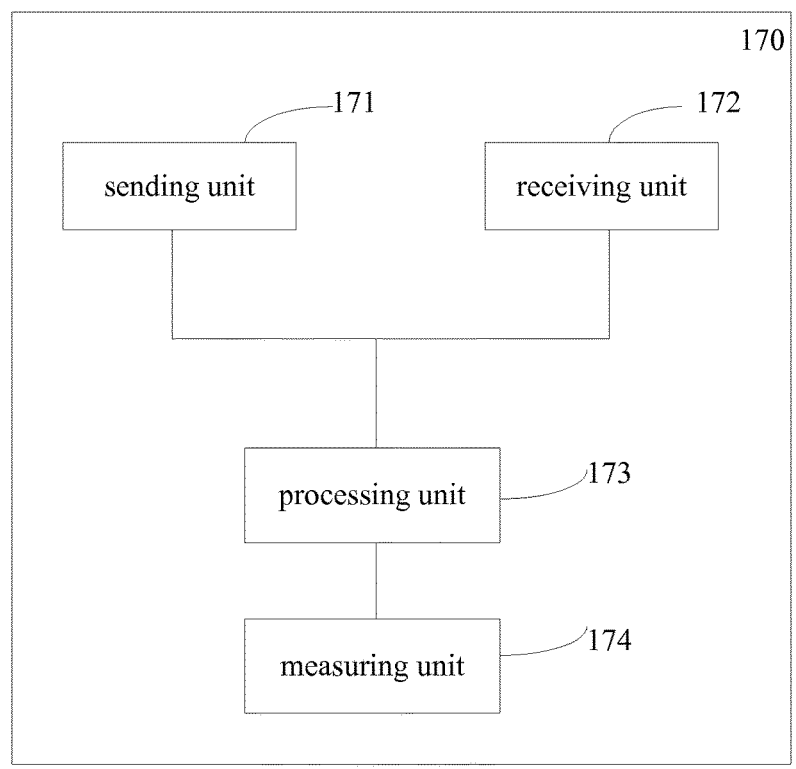
FIG. 18 is a schematic structural diagram of another UE according to the fifteenth embodiment of the present invention.

Optionally, the UE further includes a measuring unit 174 as shown in FIG. 18. The receiving unit 172 is further configured to receive a measurement parameter that is of the secondary base station and sent by the primary base station. The measuring unit 174 is configured to perform a measurement on a downlink channel of the secondary base station according to the measurement parameter. The sending unit 171 is further configured to report a measurement result to the primary base station directly or through the secondary base station.

Figure 19:
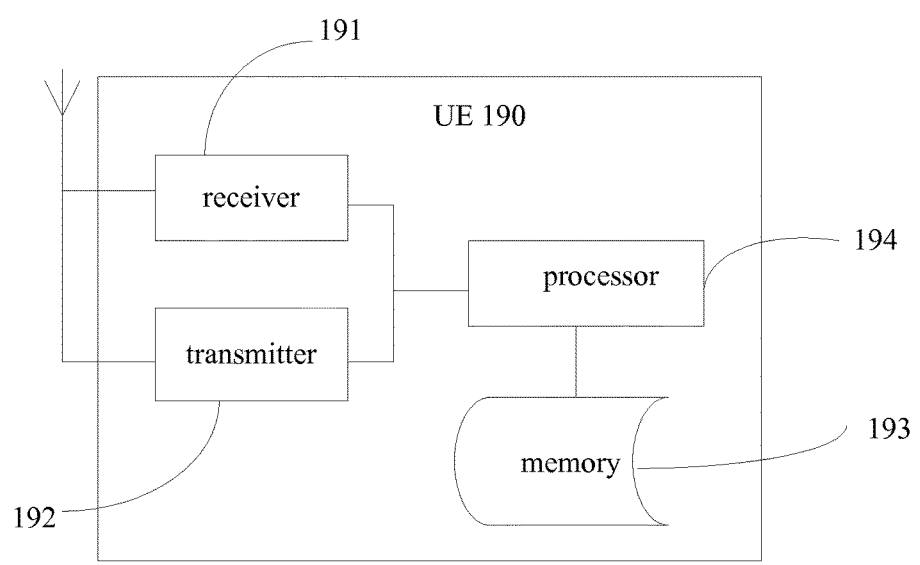
FIG. 19 is a schematic structural diagram of a UE according to a sixteenth embodiment of the present invention.

Please refer to FIG. 19, which is a schematic structural diagram of UE according to a sixteenth embodiment of the present invention. As shown in the figure, the UE 190 includes a receiver 191, a transmitter 192, a memory 193 and a processor 194 connected to the receiver 191, the transmitter 192 and the memory 193. Certainly, the UE may further include general-purpose components such as an antenna, a baseband processing component, an intermediate radio frequency processing component and an input and output device, which is not limited in the embodiment of the present invention.

The memory 193 stores a set of program code. The processor 194 is configured to invoke the program code stored in the memory 193 to perform the method on the UE side described in any one of the first embodiment to the eighth embodiment to achieve the effect described in the above embodiments, and details are not described herein again.

For example, the following operations are performed:

receiving, through the receiver 191, a configuration parameter sent by a primary base station;

feeding back, when downlink data sent by a secondary base station is received, a reception condition of the downlink data according to the configuration parameter; or retransmitting, when uplink data sent to a secondary base station needs to be retransmitted, the uplink data according to the configuration parameter.

It should be noted that, the sending unit and the receiving unit in the above embodiments may be integrated together to form a transceiving unit. The receiver and the transmitter above may be integrated together to form a transceiver. The above processor may be a central processing unit (CPU), a microprocessor and a single chip microcomputer and so on.

In addition, the secondary base station described in the above embodiments may be a new carrier type (new carrier type, NCT) base station, i.e., a base station which uses technologies such as EPDCCH, reduced cell specific reference signal (reduced cell specific reference signal), DMRS and so on. In this way, the efficiency of data transmission may be further improved. Certainly, it is only an example here and the specific form of the secondary base station is not limited in the present invention.

Through the description of the foregoing implementation manners, a person skilled in the art may clearly understand that the present invention may be implemented by using hardware, firmware, or a combination of them. When the present invention is implemented by using software, the foregoing functions may be stored in a computer readable medium or as one or more instructions or codes on a computer readable medium for transmission. The computer readable medium includes a computer storage medium and a communications medium, where the communications medium includes any medium for conveniently transferring a computer program from one place to another place. The storage medium may be any available medium that can be accessed by a computer. The following is taken as an example but is not limited to: The computer readable medium may include a RAM, a ROM, an EEPROM, a CD-ROM or another optical disc storage, magnetic disk storage or another magnetic storage device, or any other medium that can be used to carry or store desired program codes in the form of instructions or data structures and can be accessed by a computer. In addition, any connection may be appropriately used as a computer readable medium. For example, if the software is transmitted from a website, a server, or another remote source by using a coaxial cable, a fiber optic cable, a twisted pair, a digital subscriber line (DSL), or wireless technologies such as infrared, radio, and microwave, the coaxial cable, the fiber optic cable, the twisted pair, the DSL, or the wireless technologies such as infrared, radio, and microwave are included in the definition of the medium. Disk (Disk) and disc (disc), as used in the present invention, include a compact disc (CD), a laser disc, an optical disc, a digital versatile disc (DVD), a floppy disk, and a Blu-ray disc, where disks usually reproduce data magnetically, while discs reproduce data optically with lasers. The foregoing combination should also be included in the protection scope of the computer readable medium.

In conclusion, the foregoing descriptions are merely exemplary embodiments of the present invention, but are not intended to limit the protection scope of the present invention. Any modification, equivalent replacement, or improvement made within the principle of the present invention shall fall within the protection scope of the present invention.

What is claimed is:

1. A data transmission method, comprising:

sending, by a primary base station, a data transmission parameter to a secondary base station;

sending, by the primary base station in a downlink data transmission process, downlink data to the secondary base station according to the data transmission parameter, and further sending the downlink data to a user equipment through the secondary base station according to the data transmission parameter;

receiving, by the primary base station, acknowledgement information fed back by the user equipment, wherein the acknowledgement information is also fed back to the secondary base station, and a Hybrid Automatic Repeat Request (HARQ) retransmission is performed by the secondary base station; and reducing, by the primary base station when the acknowledgement information is Negative Acknowledgement (NACK), a speed of sending the downlink data to the secondary base station.

2. The method according to claim 1, wherein the data transmission parameter comprises one or more of a data packet size, a modulation and coding scheme, resource information, a maximum quantity of transmission times or a maximum quantity of retransmission times.

3. The method according to claim 1, further comprising:

sending, by the primary base station, a configuration parameter to the user equipment, wherein the user equipment feeds back a reception condition of the downlink data according to the configuration parameter.

4. The method according to claim 1, wherein in the downlink data transmission process, the primary base station sends the downlink data to the secondary base station based on maximum transmission time intervals (TTIs), and wherein the maximum TTIs refer to TTIs that are required when the primary base station assumes that the secondary base station sends each data packet at a maximum quantity of retransmission times or a maximum quantity of transmission times to complete the sending of the data packet.

5. The method according to claim 1, further comprising:

receiving, by the primary base station when an amount of data buffered in the secondary base station exceeds a threshold and maintains exceeding the threshold for a period of time, status information that is of data transmission and sent by the secondary base station; and adjusting, by the primary base station, downlink data transmission according to the status information.

6. The method according to claim 1, further comprising:

sending, by the primary base station, a measurement parameter of the secondary base station to the user equipment;

receiving, by the primary base station, a measurement result reported by the user equipment directly or through the secondary base station, wherein the measurement result is obtained after the user equipment performs measurement according to the measurement parameter; and configuring or adjusting, by the primary base station, the data transmission parameter according to the measurement result.

7. A base station, serving as a primary base station of inter-base station carrier aggregation and comprising a processor and a non-transitory computer readable storage medium, wherein the non-transitory computer readable storage medium comprises a program stored therein, and when the program runs, the following steps are performed:
   sending a data transmission parameter to a secondary base station;
   sending, in a downlink data transmission process, downlink data to the secondary base station according to the data transmission parameter, and sending the downlink data to a user equipment through the secondary base station according to the data transmission parameter;
   receiving, in the downlink data transmission process, acknowledgement information fed back by the user equipment, wherein the acknowledgement information is also fed back to the secondary base station, and a Hybrid Automatic Repeat Request (HARQ) retransmission is performed by the secondary base station; and
   reducing, when the acknowledgement information is Negative Acknowledgement (NACK), a speed of sending the downlink data to the secondary base station.

8. The base station according to claim 7, wherein the data transmission parameter comprises one or more of a data packet size, a modulation and coding scheme, resource information, a maximum quantity of transmission times or a maximum quantity of retransmission times.

9. The base station according to claim 7, wherein when the program runs, the following step is further performed:
   sending a configuration parameter to the user equipment, wherein the user equipment feeds back a reception condition of the downlink data according to the configuration parameter.

10. The base station according to claim 7, wherein in the downlink data transmission process, the downlink data is sent to the secondary base station based on maximum transmission time intervals (TTIs), and wherein the maximum TTIs refer to TTIs that are required when the primary base station assumes that the secondary base station sends each data packet at a maximum quantity of retransmission times or a maximum quantity of transmission times to complete the sending of the data packet.

11. The base station according to claim 7, wherein when the program runs, the following steps are further performed:
   receiving, when an amount of data buffered in the secondary base station exceeds a threshold and maintains exceeding the threshold for a period of time, status information that is of data transmission and sent by the secondary base station; and
   adjusting downlink data transmission according to the status information.

12. The base station according to claim 7, wherein when the program runs, the following steps are further performed:
   sending a measurement parameter of the secondary base station to the user equipment;
   receiving a measurement result reported by the user equipment directly or through the secondary base station, wherein the measurement result is obtained after the user equipment performs measurement according to the measurement parameter; and
   configuring or adjusting the data transmission parameter according to the measurement result.

13. A base station, serving as a secondary base station of inter-base station carrier aggregation and comprising a processor and a non-transitory computer readable storage medium, wherein the non-transitory computer readable storage medium comprises a program stored therein, and when the program runs, the following steps are performed:
   receiving a data transmission parameter sent by a primary base station;
   receiving, in a downlink data transmission process, downlink data that is sent by the primary base station according to the data transmission parameter, and sending, in the downlink data transmission process, the downlink data to a user equipment according to the data transmission parameter;
   receiving, in the downlink data transmission process, acknowledgement information fed back by the user equipment, wherein the acknowledgement information is also fed back to the primary base station; and
   performing, when the acknowledgement information is Negative Acknowledgement (NACK), a Hybrid Automatic Repeat Request (HARQ) retransmission, wherein when the acknowledgement information is NACK, a speed of sending downlink data to the secondary base station is reduced.

14. The base station according to claim 13, wherein in the downlink data transmission process, the downlink data is received based on maximum transmission time intervals (TTIs), and wherein the maximum TTIs refer to TTIs that are required when the primary base station assumes that the secondary base station sends each data packet at a maximum quantity of retransmission times or a maximum quantity of transmission times to complete the sending of the data packet.

15. The base station according to claim 13, wherein the downlink data sent by the primary base station to the secondary base station is buffered in the secondary base station; and when the program runs, the following step is further performed:
   sending, when an amount of data buffered in the secondary base station exceeds a threshold and maintains exceeding the threshold for a period of time, status information of data transmission to the primary base station, wherein the primary base station adjusts downlink data transmission according to the status information.

16. A user equipment, comprising a processor and a non-transitory computer readable storage medium, wherein the non-transitory computer readable storage medium comprises a program stored therein, and when the program runs, the following steps are performed:
   receiving a configuration parameter sent by a primary base station;
   feeding back, when the downlink data sent by a secondary base station in a downlink data transmission process is received, a reception condition of the downlink data according to the configuration parameter;
   feeding back acknowledgement information to both the primary base station and the secondary base station, wherein when the acknowledgement information is Negative Acknowledgement (NACK), the secondary base station performs a Hybrid Automatic Repeat Request (HARQ) retransmission and the primary base station reduces a speed of sending downlink data to the secondary base station.

17. The user equipment according to claim 16, wherein when the program runs, the following steps are performed:
   receiving a measurement parameter that is of the secondary base station and sent by the primary base station;

performing a measurement on a downlink channel of the secondary base station according to the measurement parameter; and reporting a measurement result to the primary base station directly or through the secondary base station.

* * * * *